(12) United States Patent
Amano et al.

(10) Patent No.: US 10,685,124 B2
(45) Date of Patent: Jun. 16, 2020

(54) EVALUATION APPARATUS, EVALUATION SYSTEM, AND EVALUATION METHOD

(71) Applicant: Panasonic Intellectual Property Corporation of America, Torrance, CA (US)

(72) Inventors: Hiroshi Amano, Osaka (JP); Toshihisa Nakano, Osaka (JP); Kimio Minami, Nara (JP); Takako Hirose, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 130 days.

(21) Appl. No.: 15/936,511

(22) Filed: Mar. 27, 2018

(65) Prior Publication Data

US 2018/0218158 A1    Aug. 2, 2018

Related U.S. Application Data

(63) Continuation of application No. PCT/JP2016/005040, filed on Dec. 1, 2016.

(30) Foreign Application Priority Data

Jan. 18, 2016  (JP) .................................. 2016-007481
Nov. 8, 2016   (JP) .................................. 2016-218329

(51) Int. Cl.
  *H04L 29/00*     (2006.01)
  *G06F 21/57*     (2013.01)
  (Continued)

(52) U.S. Cl.
  CPC .......... *G06F 21/577* (2013.01); *B60R 16/023* (2013.01); *G06F 7/00* (2013.01);
  (Continued)

(58) Field of Classification Search
  CPC ............. G06F 21/577; G06F 2221/034; B60R 16/023; H04L 12/40013
  See application file for complete search history.

(56) References Cited

U.S. PATENT DOCUMENTS

2015/0089236 A1*  3/2015  Han ...................... H04L 9/3271
                                                                713/181
2017/0134358 A1*  5/2017  Takada .................. H04L 12/403
(Continued)

FOREIGN PATENT DOCUMENTS

JP          2015-114833       6/2015

OTHER PUBLICATIONS

Liis Jaks, "Security Evaluation of the Electronic Control Unit Sofware Update Process", 2014, Royal Institute of Technology, School of Information and Communication Technology Kungliga Tekniska Hgskolan, pp. 1-74 (Year: 2014).*

(Continued)

*Primary Examiner* — Joseph P Hirl
*Assistant Examiner* — Chi D Nguy
(74) *Attorney, Agent, or Firm* — Greenblum & Bernstein, P.L.C.

(57) ABSTRACT

An evaluation apparatus that is connected to a bus used by a plurality of electronic control units that constitute an electronic control system for communication and that evaluates security of the electronic control system. The evaluation apparatus includes a transmitter that sends, to the bus, at least one attack frame including an invalidation frame for invalidating a frame on the bus, a monitor that monitors at least one of the plurality of electronic control units, and an evaluator that evaluates the electronic control system in terms of security on the basis of the result of monitoring performed by the monitor when the attack frame is sent from the transmitter to the bus.

13 Claims, 15 Drawing Sheets

(51) Int. Cl.
*H04W 12/12* (2009.01)
*H04L 29/06* (2006.01)
*H04L 12/40* (2006.01)
*G06F 21/55* (2013.01)
*G06F 7/00* (2006.01)
*G06F 21/85* (2013.01)
*B60R 16/023* (2006.01)

(52) U.S. Cl.
CPC .............. *G06F 21/55* (2013.01); *G06F 21/57* (2013.01); *G06F 21/85* (2013.01); *H04L 12/40* (2013.01); *H04L 12/40006* (2013.01); *H04L 63/00* (2013.01); *H04L 63/14* (2013.01); *H04L 63/1433* (2013.01); *H04W 12/12* (2013.01); *G06F 2221/034* (2013.01); *H04L 12/40013* (2013.01)

(56) References Cited

U.S. PATENT DOCUMENTS

2018/0176305 A1* 6/2018 Omori .................. B60W 50/00
2018/0196941 A1* 7/2018 Ruvio ............... H04W 12/1208

OTHER PUBLICATIONS

International Search Report of PCT Application No. PCT/JP2016/005040 dated Feb. 14, 2017.
Ryo Kurachi et al., "Proposal of the error frame monitoring system with improved Controller Area Network (CAN) controller", CSS2015, Oct. 21-23, 2015 (Partial Translation).
Tsutomu Matsumoto et al., "A Method of Fuzzing through Controller Area Network", SCIS2015, Jan. 20-23, 2015 (Whole Translation).
The Extended European Search Report dated Oct. 26, 2018 for the related European Patent Application No. 16886223.3.
Karl Koscher et al: "Experimental Security Analysis of a Modern Automobile", Security and Privacy (SP), 2010 IEEE Symposium on, IEEE, Piscataway, NJ, USA, May 16, 2010 (May 16, 2015), pp. 447-462, XP031705100.
Tobias Hoppe et al: "Security Threats to Automotive CAN Networks—Practical Examples and Selected Short-Term Countermeasures", Sep. 22, 2008 (Sep. 22, 2008), Computer Safety, Reliability, and Security; [Lecture Notes in Computer Science], Springer Berlin Heidelberg, Berlin, Heidelberg, pp. 235-248, XP019106609.

* cited by examiner

FIG. 6

| FUNCTION TO BE EVALUATED | TRANSMISSION MESSAGE | MESSAGE ID | TRANSMISSION INTERVAL | TRANSMISSION ORDER |
|---|---|---|---|---|
| REWRITING FUNCTION 1 | ERROR FRAME | — | — | 1 |
| | AUTHENTICATION SEED | 0x0034 | 20 ms | 2 |
| | AUTHENTICATION RESPONSE | 0x0256 | 20 ms | 3 |
| REWRITING FUNCTION 2 | ERROR FRAME | — | — | 1 |
| | AUTHENTICATION RESPONSE | 0x0256 | 20 ms | 2 |

FIG. 7

| FUNCTION TO BE EVALUATED | TRANSMISSION MESSAGE | MESSAGE ID | TRANSMISSION INTERVAL | TRANSMISSION ORDER |
|---|---|---|---|---|
| REWRITTEN FUNCTION 1 | ERROR FRAME | — | — | 1 |
| | MEMORY CLEAR INSTRUCTION | 0x0012 | 10 ms | 2 |
| | UPDATED SOFTWARE | 0x0056 | 10 ms | 3 |
| | UPDATED SOFTWARE SIGNATURE | 0x0178 | 10 ms | 4 |
| REWRITTEN FUNCTION 2 | ERROR FRAME | — | — | 1 |
| | UPDATED SOFTWARE | 0x0056 | 10 ms | 2 |
| | UPDATED SOFTWARE SIGNATURE | 0x0178 | 10 ms | 3 |
| REWRITTEN FUNCTION 3 | ERROR FRAME | — | — | 1 |
| | UPDATED SOFTWARE SIGNATURE | 0x0178 | 10 ms | 2 |

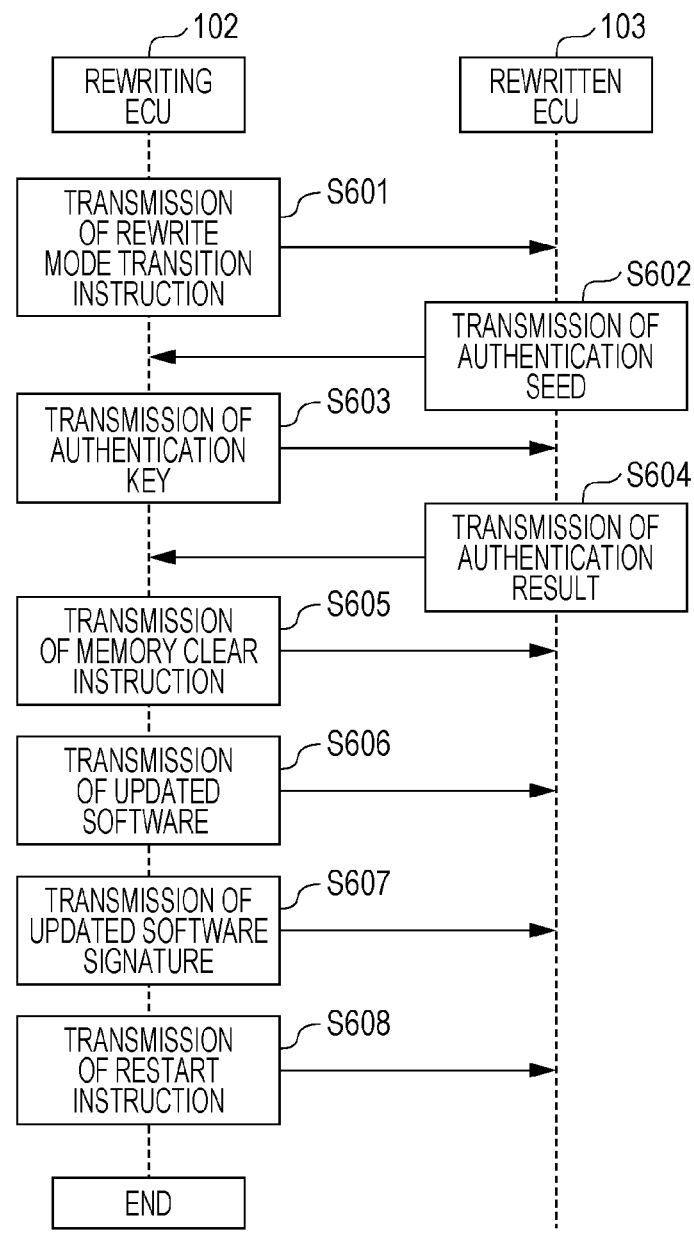

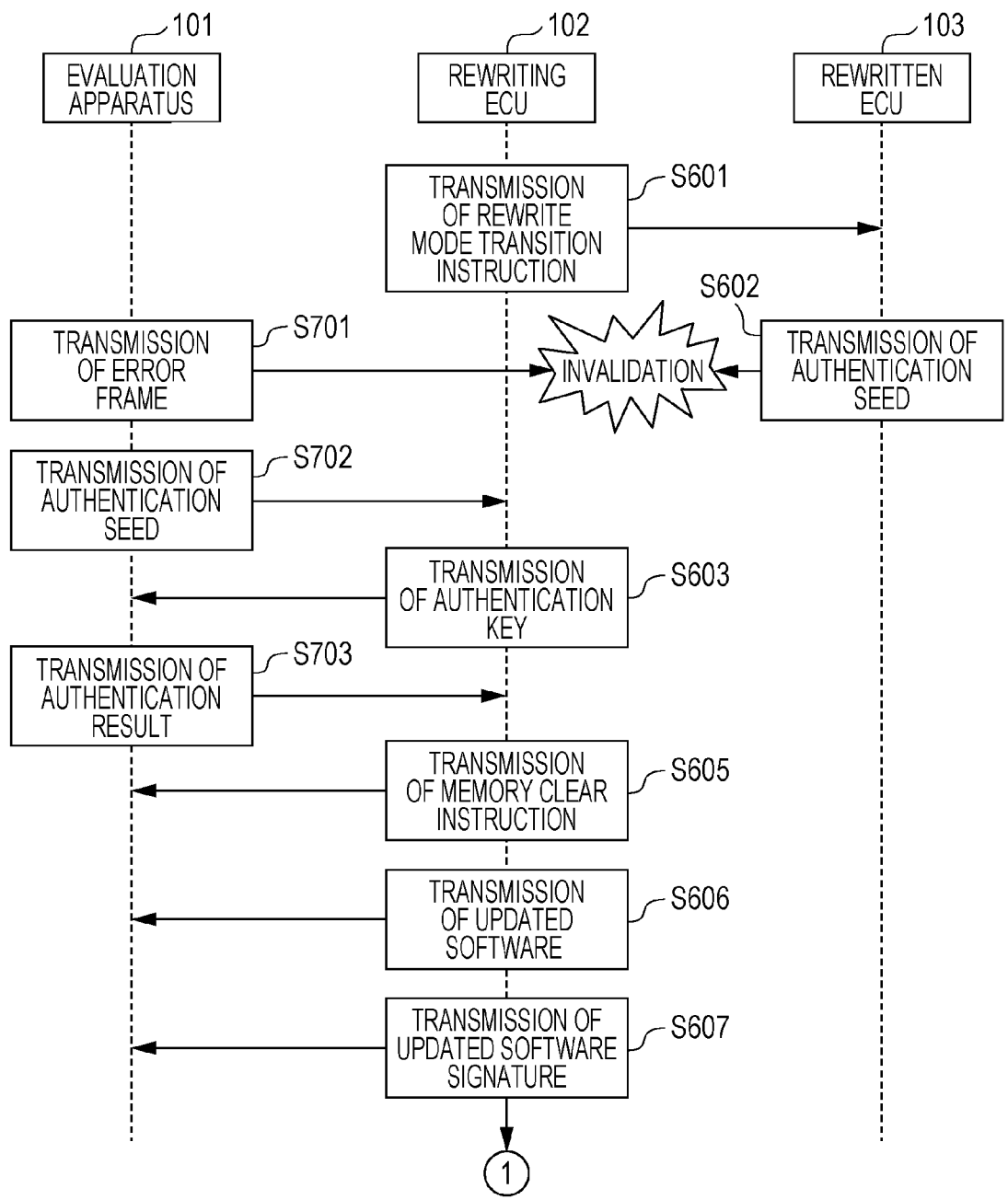

EVALUATION APPARATUS, EVALUATION SYSTEM, AND EVALUATION METHOD

BACKGROUND

1. Technical Field

The present disclosure relates to a technology for evaluating security (for example, attack tolerance) of an electronic control system including an electronic control unit of an in-vehicle network system or the like that performs communication.

2. Description of the Related Art

In recent years, a large number of electronic control units (ECU) are disposed in a motor vehicle, and an in-vehicle network that connects the ECUs with one another employs, for example, the CAN (Controller Area Network) standard defined in ISO 11898-1.

In CAN, the communication path is a bus formed from two wires, and an ECU connected to the bus is called a node. Each of the nodes connected to the bus sends and receives a message called a frame. A transmitting node that sends a frame applies voltages to the two buses to generate a potential difference between the buses. Thus, the transmitting node sends a value of "1" called recessive and a value of "0" called dominant. If a plurality of transmitting nodes transmit recessive and dominant values at exactly the same time, the dominant value is transmitted with priority. If the format of the received frame is abnormal, the receiving node sends a frame called an error frame. An error frame is six successive transmitted dominant bits to notify the transmitting node or another receiving node of the abnormality of the frame.

A known attack against an in-vehicle network is as follows. An attacker accesses an information terminal in a vehicle by using wireless communication, overwrites the program of the information terminal without authorization, and sends a desired CAN message from the information terminal to the in-vehicle network to control an actuator connected to the in-vehicle ECU against the driver's will. If the in-vehicle ECU itself is equipped with the function of wireless communication, such as V2X (Vehicle to Vehicle (V2V) and Vehicle to Infrastructure (V2I)) for self-driving, an ECU program corresponding to V2X may be overwritten without authorization and be used for attack, as in the information terminal.

To date, limited research has been carried out on a method for evaluating countermeasures for attack. For example, a fuzzing method for detecting a problem (e.g., the presence of a bug due to a programming error) by transmitting data to a single in-vehicle ECU and checking a response to the data has been developed as described in Tsutomu Matsumoto, Yuuki Kobayashi, Yuu Tsuchiya, Naoki Yoshida, Nobuyoshi Morita, and Makoto Kayashima, "Methods of Fuzzing On-Vehicle ECUs through CAN", SCIS2015, Jan. 20, 2015.

SUMMARY

In one general aspect, the techniques disclosed here feature an evaluation apparatus that is connected to a bus used by a plurality of electronic control units that constitute an electronic control system for communication and that evaluates the electronic control system. The evaluation apparatus includes a transmitter that sends, to the bus, at least one attack frame including an invalidation frame for invalidating a frame on the bus, a monitor that monitors at least one of the plurality of electronic control units, and an evaluator that evaluates the electronic control system in terms of security on the basis of the result of monitoring performed by the monitor when the attack frame is sent from the transmitting unit to the bus.

According to the present disclosure, the attack tolerance of an electronic control system including a plurality of ECUs can be evaluated (e.g., it can be evaluated whether a security countermeasure technology applied to the electronic control system properly protects the electronic control system during an attack).

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of attack procedure information held by a holding unit of the evaluation apparatus;

FIG. 7 illustrates another example of attack procedure information held by a holding unit of the evaluation apparatus;

FIG. 8 is a sequence diagram illustrating an example of the operation related to updating of software of the electronic control system;

FIG. 9 is a sequence diagram illustrating operation example 1 performed by the evaluation system;

DETAILED DESCRIPTION

Figure 1:
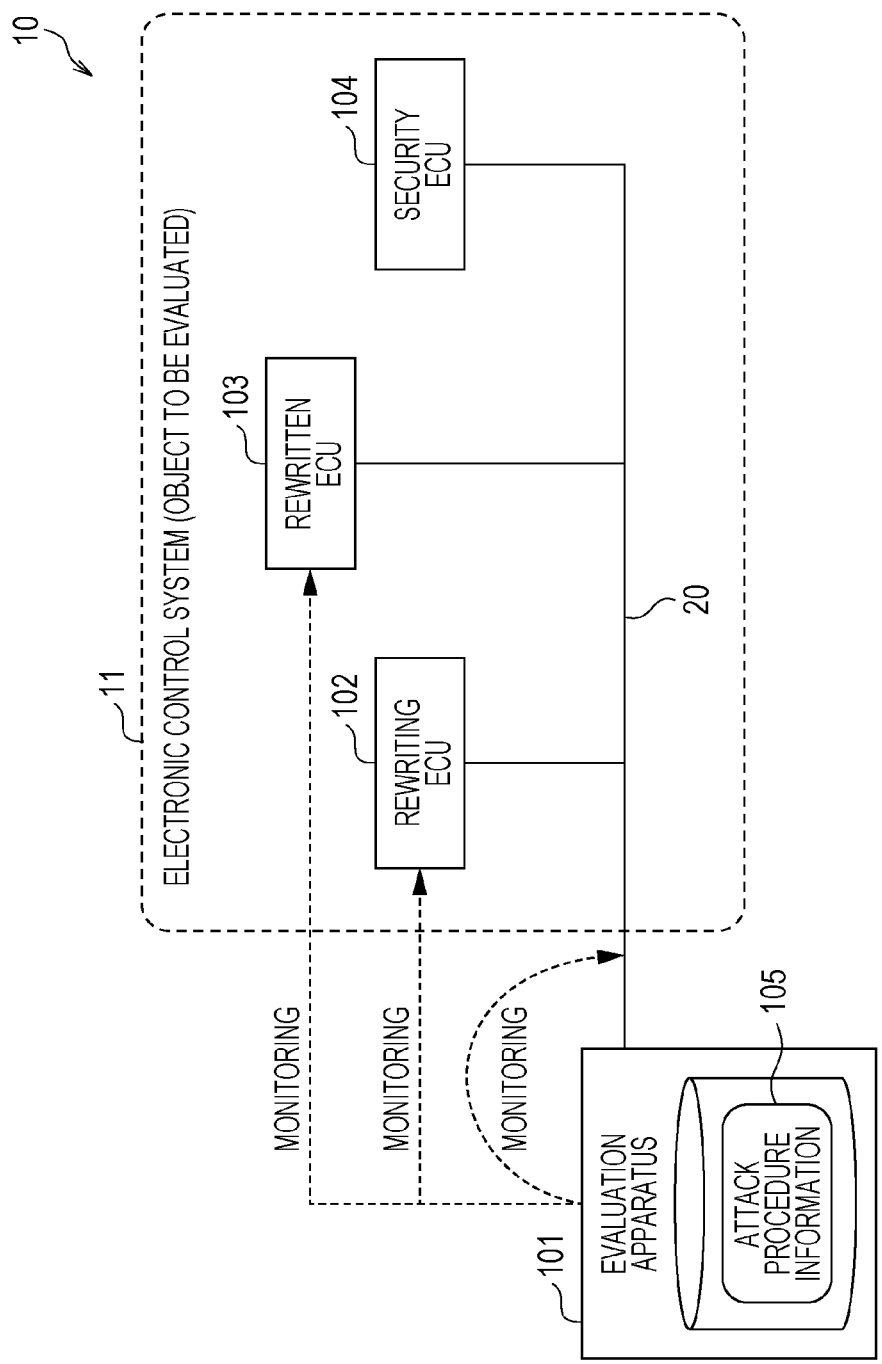
FIG. 1 is a configuration diagram illustrating a schematic configuration of an evaluation system according to an embodiment.

Underlying Knowledge Forming Basis of the Present Disclosure

Although the technique described in NPL 1 can identify problems of individual in-vehicle ECUs, it is difficult to evaluate a system (an electronic control system) formed of the plurality of ECUs that constitute an in-vehicle network in terms of security (e.g., attack tolerance such as whether or not the security countermeasure technology applied to the system to be evaluated can properly protect the system from attack).

Accordingly, the present disclosure provides an evaluation apparatus capable of evaluating an electronic control system including a plurality of ECUs in terms of security. In addition, the present disclosure provides an evaluation system that can evaluate an electronic control system including a plurality of ECUs in terms of security and an evaluation method for use in the evaluation.

According to an aspect of the present disclosure, an evaluation apparatus that is connected to a bus used by a plurality of electronic control units that constitute an electronic control system for communication and that evaluates the electronic control system. The evaluation apparatus includes a transmitter that sends, to the bus, at least one attack frame including an invalidation frame for invalidating a frame on the bus, a monitor that monitors at least one of the plurality of electronic control units, and an evaluator that evaluates the electronic control system in terms of security on the basis of the result of monitoring performed by the monitor when the attack frame is sent from the transmitter to the bus. When an attack frame (e.g., a data frame or an error frame of CAN) is sent from the transmitter to the bus (for example, immediately after transmission or during a time period from the time immediately before transmission to the time immediately after the transmission), the monitor can directly or indirectly monitor the electronic control units (ECUs). In this manner, the security function of an electronic control system including a plurality of ECUs, such as a function tor defensing an attack against the ECUs on the basis of transmission of a frame (i.e., attack tolerance), can be evaluated.

In addition, for example, the plurality of electronic control units may communicate with one another via the bus in accordance with CAN (Controller Area Network) protocol, and the invalidation frame may be an error frame. In this manner, in a network based on a CAN used to send and receive frames between the ECUs, the security function against an attack using attack frames including an error frame can be evaluated.

In addition, for example, the evaluation apparatus may further include a holder that holds attack procedure information indicating content of each of a plurality of attack frames and an order in which the attack frames are sent, and the transmitter may send, to the bus, the plurality of attack frames in the transmission order indicated by the attack procedure information. In this manner, for example, the defense function against an attack method determined by the transmission order of a plurality of frames can be evaluated.

In addition, for example, the evaluation apparatus may further include a receiver that receives a frame from the bus. The attack procedure information may indicate that an attack frame having a predetermined ID is sent subsequent to an error frame, and the transmitter may send the error frame if the receiver receives the frame having the predetermined ID from the bus. In this manner, the security function against an attack method that enables an attacker to spoof the ECU specified as a transmission source of a frame having the predetermined ID can be evaluated.

In addition, for example, the attack procedure information may further indicate a transmission interval of the plurality of attack frames, and the transmitter may send the plurality of frames to the bus in accordance with the transmission order and the transmission interval indicated by the attack procedure information. In this manner, for example, the defense function against an attack method determined by transmission order and transmission interval of a plurality of frames can be evaluated.

In addition, for example, after sending the error frame, the transmitter may send an attack frame having the same ID as a frame invalidated by the error frame and content that differs from content of the invalidated frame. In this manner, the security function can be efficiently evaluated by, for example, using a relatively easily performed attack method in which a frame sent to the bus of the electronic control system is invalidated with an error frame and, thereafter, a frame having partially modified content is sent.

In addition, for example, after sending an error frame, the transmitter may send an attack frame having an update ID predetermined for a process to update software of any one of the plurality of electronic control units in the electronic control system, and the monitor may monitor one of the electronic control unit having a function of updating the held software in response to reception of a frame having the update ID and the electronic control unit that sends a frame having the update ID. The process to update software may be a main update process or a sub-update process, such as a pre-update process or a post-update process performed for appropriate update. Alternatively, the process to update software may include both the main update process and sub-update process. In this manner, for example, the security function of the electronic control system against an attack related to updating of software, such as firmware of the ECU, which is one type of attack by an attacker to dominate some of the ECUs of the electronic control system, can be evaluated.

In addition, for example, the monitor may perform the monitoring by detecting whether an operation performed by one of the plurality of electronic control units when an attack frame is sent from the transmitter to the bus is the same as a predetermined operation, and the evaluator may evaluate the electronic control system so that a result of the evaluation of the electronic control system varies in accordance with a result of the detection performed by the monitor unit after the attack frame is sent from the transmitter to the bus. The predetermined operation can be, for example, an operation performed by the ECU and anticipated (expected) when the attack succeeds, an operation performed by the ECU and anticipated when the attack fails, or a normal operation performed by the ECU in the case where the ECU receives an authorized frame. In this manner, the security function of the electronic control system can be properly evaluated.

In addition, for example, the evaluation apparatus may further include a receiver that receives a frame from the bus. The monitor may detect that a particular frame is received by the receiver as a result of the monitoring of the electronic control unit. The evaluator unit may evaluates the electronic control system so that a result of evaluation of the electronic control system varies in accordance with whether the monitor has detected reception of the particular frame within a predetermined period of time after transmission of the attack frame from the transmitter to the bus. The particular frame is a frame that is anticipated (expected) to be sent when, for example, the attack succeeds or fails. The particular frame can be identified by the ID of the frame specified by the electronic control system, for example. Thus, the electronic control system can be properly evaluated by monitoring the bus without, for example, directly communicating with the ECU.

In addition, for example, the evaluator may output, as a result of evaluation, information as to whether the electronic control system has attack tolerance. In this manner, for example, the users of the evaluation apparatus can get to know whether the electronic control system has attack tolerance.

According to another aspect of the present disclosure, an evaluation system for evaluating an electronic control system is provided. The electronic control system includes a plurality of electronic control units that communicate with one another via a bus. The evaluation system includes a transmitter that sends, to the bus, at least one attack frame including an invalidation frame for invalidating a frame on the bus, a monitor that monitors at least one of the plurality of electronic control units, and an evaluator that evaluates the electronic control system in terms of security on the basis of the result of monitoring performed by the monitor when the attack frame is sent from the transmitter to the bus. In this manner, the security function, such as a defense function against an attack using transmission of a frame to an ECU in an electronic control system including a plurality of ECUs, can be evaluated.

According to still another aspect of the present disclosure, an evaluation method for evaluating an electronic control system is provided. The electronic control system includes a plurality of electronic control units that communicate with one another via a bus. The evaluation method includes sending, to the bus, at least one attack frame including an invalidation frame for invalidating a frame on the bus, monitoring at least one of the plurality of electronic control units when the attack frame is sent to the bus, and evaluating the electronic control system in terms of security on the basis of a result of the monitoring. In this manner, the security function of an electronic control system including a plurality of ECUs, such as a defense function against an attack using transmission of a frame, can be evaluated.

It should be noted that general or specific embodiments may be implemented as a system, a method, an integrated circuit, a computer program, a computer-readable storage medium, such as a CD-ROM, or any selective combination thereof.

Evaluation systems according to embodiments are described below with reference to the accompanying drawings. Each of the embodiments here describes a particular example of the present disclosure. Therefore, a value, a shape, a material, a constituent element, the positions and the connection form of the constituent elements, steps, and the sequence of steps used in the embodiments are only examples and it should not be construed that the technical scope of the disclosure is limited thereto. In addition, among the constituent elements in the embodiments described below, the constituent element that does not appear in an independent claim is an optional constituent element that can be additionally provided. Furthermore, all of the drawings are schematic and not necessarily to scale.

First Embodiment

An evaluation apparatus and an evaluation method for evaluating an in-vehicle network system (an electronic control system) and an evaluation system including an electronic control system and an evaluation apparatus are described below. The in-vehicle network system is mounted in an automobile (a vehicle) and includes a plurality of electronic control units (ECUs) which communicate with one another via a bus.

1.1 Configuration of Evaluation System

FIG. 1 is a configuration diagram illustrating a schematic configuration of an evaluation system 10. As illustrated in FIG. 1, the evaluation system 10 includes an evaluation apparatus 101 and an electronic control system 11. The evaluation system 10 evaluates the electronic control system 11 in terms of attack tolerance (e.g., evaluates whether or not the security countermeasure technique for protecting against attack is appropriately functioning).

The electronic control system 11 is an in-vehicle network system, which includes an in-vehicle network having a plurality of electronic control units (ECUs) connected to various devices, such as a control device, a sensor, actuators (e.g., an electronically controlled steering mechanism, an accelerator, and a brake), and a user interface device in the vehicle. The ECUs send and receive frames via an in-vehicle bus (a CAN bus). In the electronic control system 11, the ECUs exchange frames with one another to cooperate with one another. Thus, for example, a parking support function, a lane keeping support function, and a collision avoidance function, which are the functions of an advanced driver assistance system (ADAS), are provided. Each of the ECUs is controlled by software, and the software of the ECU can be rewritten (updated) by a procedure including sending/receiving of a certain kind of frame via the CAN bus.

A plurality of ECUs are included in a vehicle. However, for convenience of description, as illustrated in FIG. 1, the electronic control system 11 includes a rewriting ECU 102, a rewritten ECU 103, and a security ECU 104, as an example. Note that the ECUs communicate with one another by using the CAN bus 20 as a communication path in accordance with the CAN standard (the CAN protocol). A data frame (also referred to as a "CAN message"), which is a frame used for data transmission in the CAN, is defined so as to include an ID field for storing an ID (a message ID) and a data field for storing data.

The rewriting ECU 102 is connected to the CAN bus 20 and has a function of sending, to the CAN bus 20, an update frame, which is a CAN message (a data frame) for updating the software of the rewritten ECU 103 (a rewriting function). The update frame is a frame having, as a message ID, an update ID predetermined for software update processing in the electronic control system 11. Examples of an update frame include a frame indicating a rewrite mode transition instruction, a frame indicating an authentication key, a frame indicating a memory clear instruction, a frame indicating updated software (an updated program serving as updated software), a frame indicating an updated software signature (a digital signature for the updated software), and a frame indicating a restart instruction. The rewriting ECU 102 is, for example, an ECU having a function of fetching updated software from the outside into the electronic control system 11. Particular examples of the rewriting ECU 102 include an ECU having a car navigation function, an ECU having an external communication function for communicating with the outside of the vehicle, an ECU having a function of reading data from a mounted recording medium, and a diagnostic tool (a fault diagnostic tool) connected to a diagnostic port. The diagnostic port is an interface for communicating with a diagnostic tool, such as OBD 2 (On-Board Diagnostics 2) on the in-vehicle network (the CAN bus).

The rewritten ECU 103 is connected to the CAN bus 20 and has a function for updating the software therein (the software in the rewritten ECU 103) (a rewritten function) upon receiving an update frame. For example, the rewritten ECU 103 may be an ECU for controlling an actuator (for example, a steering mechanism, an accelerator, or a brake), and the software to be updated may be, for example, software for a process including control of the actuator.

The security ECU 104 monitors the CAN bus 20 at all times. For example, upon detecting that an unauthorized CAN message (a CAN message for attack) is flowing, the security ECU 104 performs an appropriate process, such as invalidating the CAN message. Any method for invalidating the CAN message can be employed. For example, by sending an error frame stipulated in the CAN protocol so that the unauthorized CAN message is superimposed with the error message, the unauthorized CAN message can be invalidated.

The evaluation apparatus 101 is an apparatus for evaluating the attack tolerance of the security countermeasure technology applied to the electronic control system 11 (an object to be evaluated). The evaluation apparatus 101 launches an attack against (hacks) the object to be evaluated on the basis of attack procedure information 105 stored therein, performs monitoring to observe a response to the attack, and evaluates the security countermeasure technology in accordance with the result of monitoring. An example of the evaluation performed by the evaluation apparatus 101 is, for example, a determination as to whether the technology has tolerance against the attack (success or failure of attack or defense). More specifically, in the monitoring, the evaluation apparatus 101 monitors a frame (a message) flowing through the CAN bus 20. In addition, the evaluation apparatus 101 monitors signals output from the rewriting ECU 102 and the rewritten ECU 103 as the monitoring. Note that the evaluation apparatus 101 may monitor the behavior (the operation) of the actuator or the like controlled by the rewriting ECU 102 or the rewritten ECU 103. The attack procedure information 105 indicates the procedure (e.g., the type, sequence, timing, and frequency of frames to be sent) when the attack is launched.

Each of the constituent elements of the evaluation system 10 is described in detail below.

1.2 Configuration of Evaluation Apparatus

Figure 2:
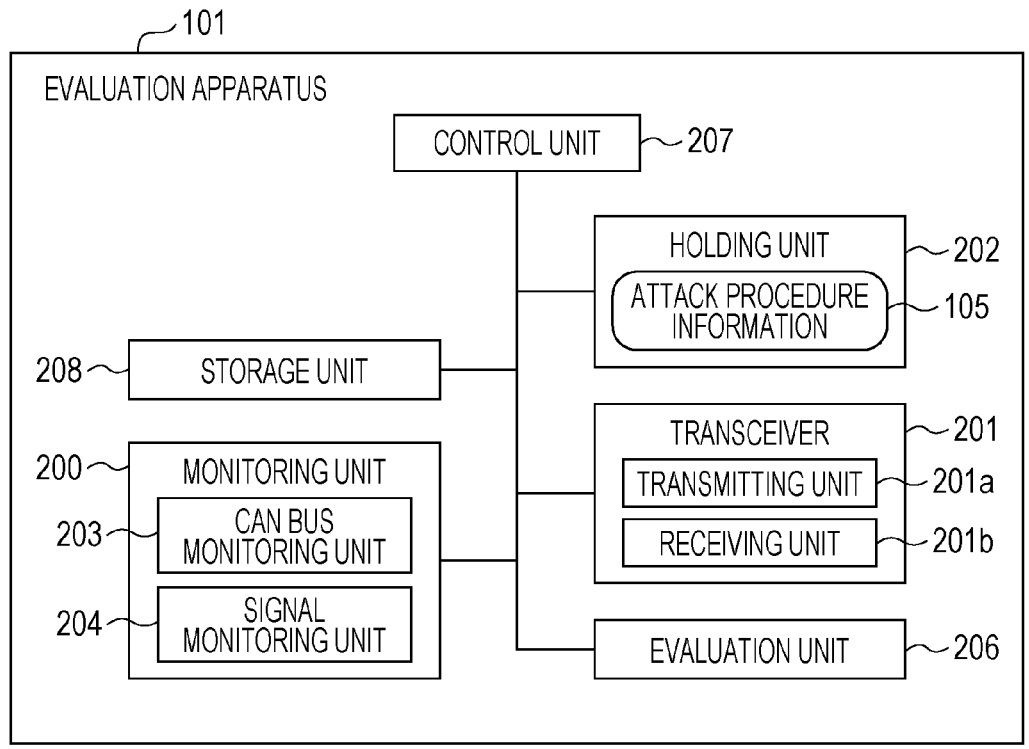
FIG. 2 is a configuration diagram of an evaluation apparatus of the evaluation system.

FIG. 2 is a configuration diagram of the evaluation apparatus 101 in the evaluation system 10.

As illustrated in FIG. 2, the evaluation apparatus 101 includes a monitoring unit 200 (a CAN bus monitoring unit 203 and a signal monitoring unit 204), a transceiver 201 (a transmitting unit 201a and a receiving unit 201b), a holding unit 202, an evaluation unit 206, a control unit 207, and a storage unit 208.

The evaluation apparatus 101 is, for example, an apparatus including a processor (a microprocessor), a digital circuit such as a memory, an analog circuit, a communication circuit, and a hard disk. Examples of a memory is a ROM and a RAM. The memory can store a control program (a computer program as software) to be executed by the processor. For example, the processor operates (controls various circuits or the like) in accordance with the control program (the computer program), so that the evaluation apparatus 101 provides various functions. In order to achieve a predetermined function, the computer program is formed by combining a plurality of instruction codes defining instructions to the processor.

(1) Transceiver

The transceiver 201 is achieved using a communication circuit and the like. The transceiver 201 includes the transmitting unit 201a and the receiving unit 201b. The transmitting unit 201a sends, to the CAN bus 20, a CAN message (for example, various types of frames indicating various types of information, such as a rewrite mode transition instruction, an authentication key, a memory clear instruction, updated software, and an updated software signature) or an error frame. The error frame invalidates a CAN message flowing through the CAN bus 20 and, for example, can cause the ECU that has sent the invalidated CAN message to enter a bus-off mode or an error active mode. The receiving unit 201b receives CAN messages flowing through the CAN bus 20 (for example, a variety of frames indicating a rewrite mode transition instruction, an authentication key, a memory clear instruction, updated software, an updated software signature, a restart instruction, an authentication seed, and the result of authentication sent from the rewriting ECU 102 or the rewritten ECU 103).

(2) Holding Unit

The holding unit 202 is achieved by a storage medium, such as a memory or a hard disk. The holding unit 202 stores the attack procedure information 105 indicating the procedure for an attack that the evaluation apparatus 101 carries out to evaluate, for example, the attack tolerance of the object to be evaluated. The attack procedure information 105 indicates the order in which a plurality of frames for attack (CAN messages or error frames) are transmitted. The attack procedure information 105 is described in more detail below with reference to FIGS. 6 and 7.

(3) CAN Bus Monitoring Unit

The CAN bus monitoring unit 203 is achieved by, for example, a processor that executes a program. The CAN bus monitoring unit 203 monitors the CAN bus 20 having a plurality of ECUs connected thereto in the electronic control system 11 to be evaluated. More specifically, the CAN bus monitoring unit 203 receives a CAN message via the receiving unit 201b, stores, in the storage unit 208, the content of the data (the payload) included in the CAN message, and identifies the content. For example, the CAN bus monitoring unit 203 monitors the rewriting ECU 102 by detecting that each of update frames indicating a rewrite mode transition instruction, an authentication key, a memory clear instruction, updated software, an updated software signature, and a restart instruction is transmitted to the CAN bus 20 and identifying the content of the frame. In addition, the CAN bus monitoring unit 203 monitors the rewritten ECU 103 by, for example, detecting that each of the frames indicating an authentication seed and the result of authentication has been transmitted to the CAN bus 20 and identifying the content of the frame. By using the CAN bus monitoring unit 203, the monitoring unit 200 monitors each of the ECUs of the electronic control system 11 by detecting whether a particular frame has been received by the receiving unit 201b. The particular frame may be a predetermined frame that contains a particular content and that is specified by an ID of the frame or the content of the data field, for example. The particular frame is a frame determined in advance so that by determining whether some of the ECUs of the electronic control system 11 have sent the particular frames when the electronic control system 11 was attacked by transmission of attack frames, it can be determined whether the attack has been successful or the defense has been successful.

(4) Signal Monitoring Unit

The signal monitoring unit 204 observes signals output to signal lines and the like other than the CAN bus 20 by the rewriting ECU 102 and the rewritten ECU 103 and checks the signal content. The signal monitoring unit 204 is achieved by using, for example, a communication circuit connected to the signal lines to which the rewriting ECU 102 and the rewritten ECU 103 output the signals and a processor that executes a program. Note that for example, the signal monitoring unit 204 may monitor output signals for debugging output from the rewriting ECU 102 and the rewritten ECU 103, and each of the ECUs of the electronic control system 11 may output an output signal for debugging when the electronic control system 11 is evaluated. In such a case, each of the ECUs may be configured to output, as an output signal for debugging, information regarding the state of the ECU, information regarding the memory content, or information indicating that the processor executing the software has been reset (restarted), for example. For example, by observing the signal, the signal monitoring unit 204 can determine whether the rewritten ECU 103 has completed processing relating to software update (rewriting) by performing a reboot process. When an attack frame is sent to the CAN bus 20 by the transmitting unit 201a, the monitoring unit 200 detects whether the operation of any one of the ECUs of the electronic control system 11 is the same as one of the predetermined operations (e.g., the operation presumed to be performed when the attack succeeds, the operation presumed to be performed when the attack fails, and a normal operation performed when an authorized frame is received) by using, for example, the signal monitoring unit 204. In this manner, the monitoring unit 200 monitors the ECU.

(5) Evaluation Unit

The evaluation unit 206 is achieved by a processor or the like that executes a program. The evaluation unit 206 evaluates the security of the electronic control system 11 on the basis of the result of determination obtained through monitoring performed by the monitoring unit 200 (the CAN bus monitoring unit 203 and the signal monitoring unit 204). More specifically, the evaluation unit 206 compares all or some of the results of determination made by the monitoring unit 200 with an expected value at the time of transmitting the CAN message on the basis of the attack procedure information 105 and determines whether the attack is successful (e.g., whether the defense function against attack has been properly activated). The expected value is a CAN message or information (e.g., an operation) indicated by the transmitted signal that is sent from the rewriting ECU 102 or the rewritten ECU 103 and that is expected as the result of the attack (e.g., the result of the transmission of each of the attack frames). The expected value can be predefined. The evaluation unit 206 performs the evaluation on the basis of the result of monitoring performed by the monitoring unit 200 when the transmitting unit 201a sends an attack frame to the CAN bus 20 on the basis of the attack procedure information 105 (e.g., during a given period of time immediately after transmission or a period of time from the time immediately before transmission to the time immediately after transmission). For example, the evaluation unit 206 can determine whether transmission of a particular frame representing the expected value on the CAN bus 20 is detected by the CAN bus monitoring unit 203 within a certain period of time after one or more attack frames indicated by the attack procedure information 105 are transmitted to the CAN bus 20 by the transmitting unit 201a and perform the evaluation so that the result of evaluation varies depending on whether the particular frame has been detected. In addition, for example, the evaluation unit 206 can perform the evaluation so that the result of evaluation varies depending on whether a signal indicating that the rewriting ECU 102 or the rewritten ECU 103 has performed a predetermined operation related to the expected value within a given period of time after transmission of at least one attack frame on the CAN bus 20 is detected by the signal monitoring unit 204.

(6) Storage Unit

The storage unit 208 consists of a storage medium, such as a memory, and stores fake updated software (updated software), a fake signature for the updated software, an update procedure, and the content of the CAN message received from the CAN bus 20 (e.g., a memory clear instruction, updated software, an updated software signature, an authentication key, and an authentication seed).

(7) Control Unit

The control unit 207 is achieved by a processor or the like that executes a program. The control unit 207 manages and controls the monitoring unit 200, the transceiver 201, the holding unit 202, the storage unit 208, and the evaluation unit 206. Thus, the control unit 207 provides the function of the evaluation apparatus 101. In addition, the control unit 207 can perform arithmetic processing needed to, for example, generate and identify an authentication key.

1.3 Configuration of Rewriting ECU

Figure 3:
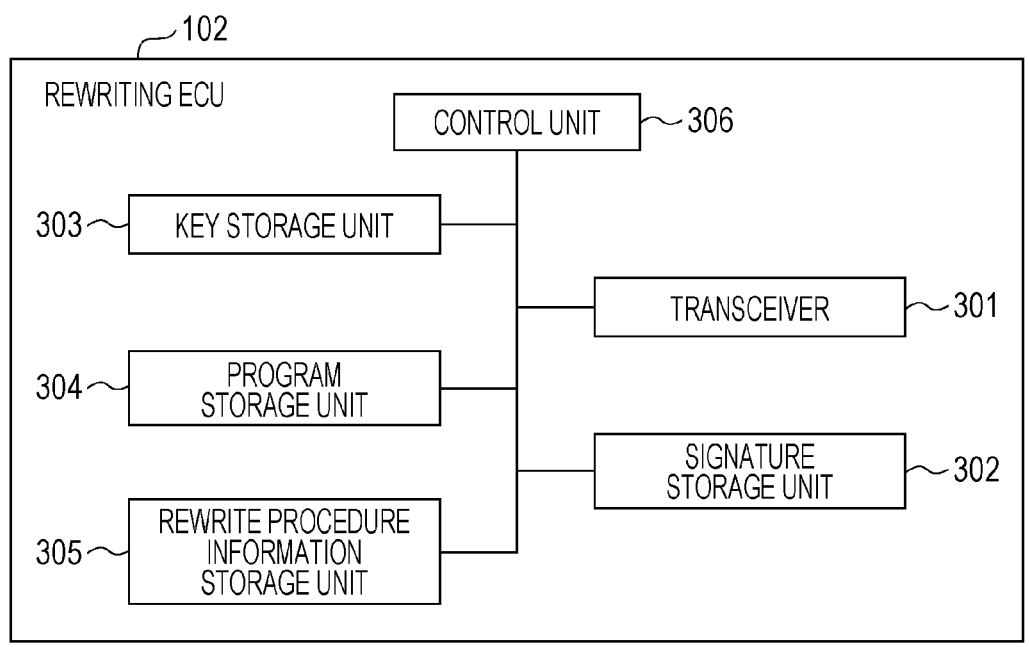
FIG. 3 is a configuration diagram of a rewriting ECU of an electronic control system to be evaluated.

FIG. 3 is a configuration diagram of the rewriting ECU 102.

As illustrated in FIG. 3, the rewriting ECU 102 includes a transceiver 301, a signature storage unit 302, a key storage unit 303, a program storage unit 304, a rewrite procedure information storage unit 305, and a control unit 306.

The rewriting ECU 102 is an ECU connected to the CAN bus 20. The ECU is a device including, for example, a processor, a digital circuit, such as a memory, an analog circuit, and a communication circuit. The memory is, for example, a ROM or a RAM. The memory can store a control program to be executed by the processor. For example, the processor operates (for example, controls a variety of circuits) in accordance with the control program (a computer program), so that the rewriting ECU 102 achieves the function thereof.

(1) Transceiver

The transceiver 301 sends a CAN message to the CAN bus 20 and receives a CAN message flowing on the CAN bus 20. The transceiver 301 sends, for example, update frames each indicating one of the rewrite mode transition instruction, the authentication key, the memory clear instruction, the updated software, the updated software signature, and the restart instruction and receives frames each indicating the authentication seed and the result of authentication flowing on the CAN bus 20. In addition, the transceiver 301 has, for example, an external communication function for communicating with a device outside the electronic control system 11 (outside the vehicle) and receives, for example, updated software and an updated software signature from the external device.

Note that the authentication seed used in the updating process performed by the rewriting ECU 102 to update the software in the rewritten ECU 103 is information used by the rewriting ECU 102 and the rewritten ECU 103 to authenticate each other. In addition, the authentication key is information generated by the rewriting ECU 102 performing encryption by using a private key common to the rewriting ECU 102 and the rewritten ECU 103 on the basis of the authentication seed sent from the rewritten ECU 103. In the updating process, the rewriting ECU 102 generates the authentication key by performing encryption by using the common private key on the basis of the authentication seed sent from the rewritten ECU 103 and sends the authentication key to the rewritten ECU 103. The rewritten ECU 103 decrypts the authentication key by using the common private key. If the result of decoding is the same as the authentication seed previously sent, it is determined that the authentication succeeds. However, if the result of decoding is not the same as the authentication seed, it is determined that the authentication fails. Thereafter, the rewritten ECU 103 sends, to the rewriting ECU 102, the result of authentication, which is the result of determination (e.g., information indicating that rewriting is allowed if the authentication succeeds or indicating that rewriting is not allowed if the authentication fails). If the authentication succeeds, a memory erase command, update software, an update software signature, a restart instruction and the like are sent from the rewriting ECU 102 in order to rewrite the software. Thus, the software in the rewritten ECU 103 is updated.

(2) Signature Storage Unit

The signature storage unit 302 stores the signature for the updated software stored in the program storage unit 304.

(3) Key Storage Unit

The key storage unit 303 stores a key (a private key) used to encrypt the authentication seed sent from the rewritten ECU 103 when an authentication key is generated.

(4) Program Storage Unit

The program storage unit 304 stores updated software for the rewritten ECU 103.

(5) Rewrite Procedure Information Storage Unit

The rewrite procedure information storage unit 305 stores the procedure for updating the software in the rewritten ECU 103 (a processing procedure related to rewriting of software).

(6) Control Unit

The control unit 306 manages and controls the transceiver 301, the signature storage unit 302, the key storage unit 303, the program storage unit 304, and the rewrite procedure information storage unit 305. The control unit 306 provides the function of the rewriting ECU 102. That is, the control unit 306 can control each of the units in accordance with the rewrite procedure information (the update procedure) stored in the rewrite procedure information storage unit 305 and perform an update process for updating the software in the rewritten ECU 103 to the updated software (a series of processes including transmission of a variety of update frames and reception of the authentication seed and the result of authentication).

1.4 Configuration of Rewritten ECU

Figure 4:
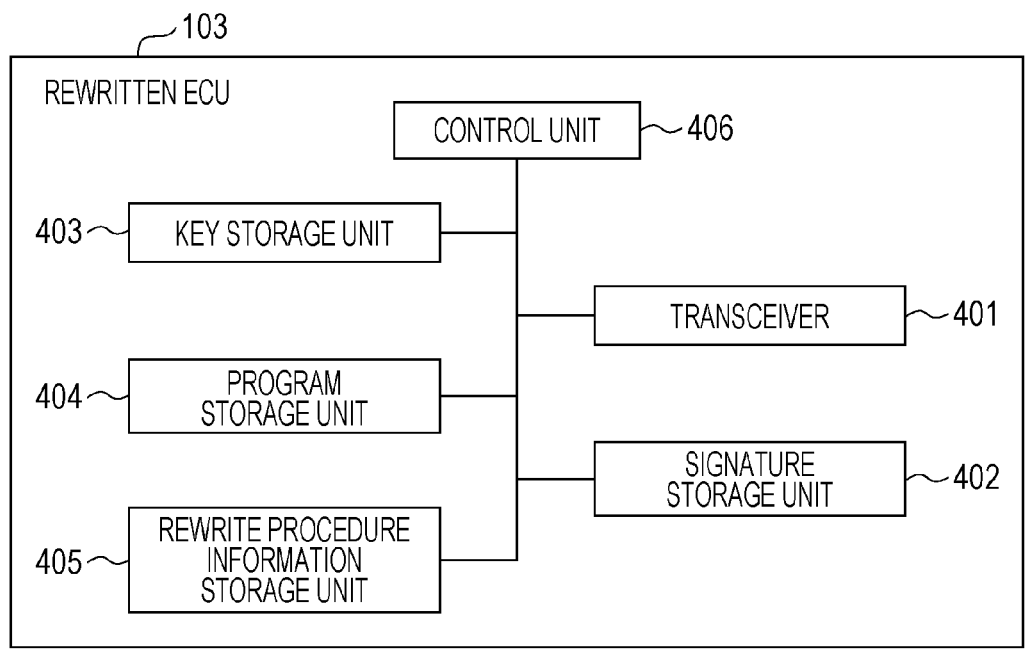
FIG. 4 is a configuration diagram of a rewritten ECU of the electronic control system to be evaluated.

FIG. 4 is a configuration diagram of the rewritten ECU 103.

As illustrated in FIG. 4, the rewritten ECU 103 includes a transceiver 401, a signature storage unit 402, a key storage unit 403, a program storage unit 404, a rewrite procedure information storage unit 405, and a control unit 406.

The rewritten ECU 103 is an ECU connected to the CAN bus 20 and is a device including, for example, digital circuits, such as a processor and a memory, an analog circuit, and a communication circuit. For example, the processor operates in accordance with a control program stored in the memory and, thus, the rewritten ECU 103 provides the function thereof.

(1) Transceiver

The transceiver 401 sends a CAN message to the CAN bus 20 and receives a CAN message flowing on the CAN bus 20. For example, the transceiver 401 sends frames each indicating one of the authentication seed and the result of authentication and receives update frames each indicating one of a rewrite mode transition instruction, an authentication key, a memory clear instruction, updated software, an updated software signature, and a restart instruction flowing on the CAN bus 20.

(2) Signature Storage Unit

The signature storage unit 402 stores the signature for the updated software stored in the program storage unit 404.

(3) Key Storage Unit

The key storage unit 403 stores a decryption key (a private key) used to decrypt the authentication key generated by the rewriting ECU 102 through encryption based on the authentication seed sent from the rewritten ECU 103. In addition, the key storage unit 403 stores a signature verification key used to verify the validity of the signature stored in the signature storage unit 402, that is, the signature of the program (the updated software) stored in the program storage unit 404.

(4) Program Storage Unit

The program storage unit 404 stores the software of the rewritten ECU 103 (for example, the updated software acquired from the rewriting ECU 102).

(5) Rewrite Procedure Information Storage Unit

The rewrite procedure information storage unit 405 stores the procedure for updating the software of the rewritten ECU 103.

(6) Control Unit

The control unit 406 manages and controls the transceiver 401, the signature storage unit 402, the key storage unit 403, the program storage unit 404, and the rewrite procedure information storage unit 405 and provides the function of the rewritten ECU 103. That is, the control unit 406 can control each of the units in accordance with the rewrite procedure information (the update procedure) stored in the rewrite procedure information storage unit 405 and perform update processing for updating the software of the rewritten ECU 103 to the updated software (a series of processes including reception of a variety of update frames and transmission of the authentication seed and the result of authentication).

1.5 Configuration of Security ECU

Figure 5:
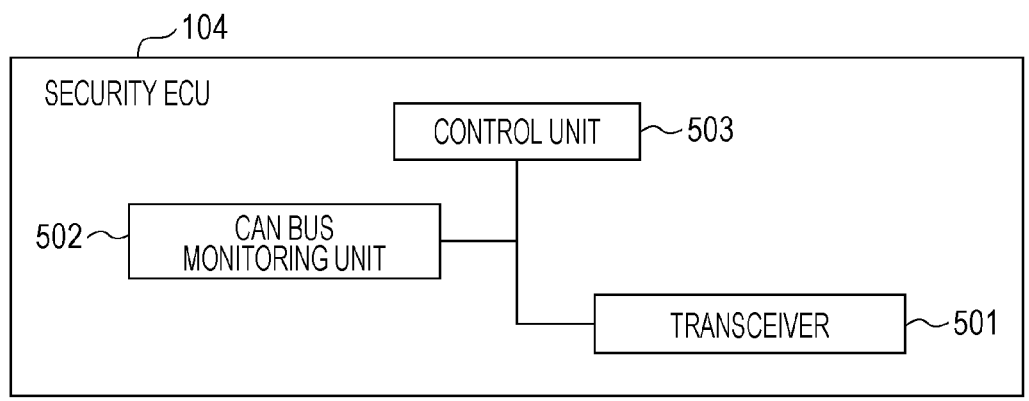
FIG. 5 is a configuration diagram of a security ECU of the electronic control system to be evaluated.

FIG. 5 is a configuration diagram of the security ECU 104.

As illustrated in FIG. 5, the security ECU 104 includes a transceiver 501, a CAN bus monitoring unit 502, and a control unit 503.

The security ECU 104 is an ECU that is connected to the CAN bus 20 and that is provided with a security function for resisting attack (e.g., a defense function). The processor of the security ECU 104 operates in accordance with the control program (a computer program) stored in the memory, so that the security ECU 104 provides the function thereof.

(1) Transceiver

The transceiver 501 receives a CAN message flowing on the CAN bus 20. Upon receiving an instruction from the CAN bus monitoring unit 502, the transceiver 501 sends an error frame to the CAN bus 20 to invalidate an unauthorized CAN message.

(2) CAN Bus Monitoring Unit

The CAN bus monitoring unit 502 checks the content of data (the payload) included in a CAN message received from the transceiver 501 via the CAN bus 20 having a plurality of ECUs connected thereto. If the CAN bus monitoring unit 502 determines that an unauthorized CAN message (e.g., a CAN message that does not follow a rule prescribed for the electronic control system 11) is flowing, the CAN bus monitoring unit 502 sends an error frame via the transceiver 501. At this time, the CAN bus monitoring unit 502 may employ any technique for detecting an unauthorized CAN message.

(3) Control Unit

The control unit 503 manages and controls the transceiver 501 and the CAN bus monitoring unit 502 and achieves the function of the security ECU 104.

1.6 Attack Procedure Information

The attack procedure information stored in the holding unit 202 of the evaluation apparatus 101 is described below. FIG. 6 and FIG. 7 illustrate examples of the attack procedure information.

As illustrated in FIG. 6 and FIG. 7, the attack procedure information includes, for example, the content and the message ID of a transmission message (a frame to be sent for attack to evaluate a function to be evaluated), the transmission interval of the transmission message (a time interval between the previous frame and the present frame), and the transmission order for each of the evaluation items for the evaluation apparatus 101 (for each of the functions to be evaluated). For example, the attack procedure information is determined on the basis of various kinds of information regarding the electronic control system 11 (e.g., the specification).

For example, in the example of the evaluation item "rewriting function 1" illustrated in FIG. 6, which is a function to be evaluated, the attack procedure is as follows: Invalidate a CAN message including the authentication seed sent from the rewritten ECU 103 by sending an error frame first. Subsequently (secondly), send a CAN message including a fake authentication seed. Subsequently (thirdly), after receiving an authentication key corresponding to the authentication seed from the rewriting ECU 102, send, as a response, a CAN message including the result of authentication (an authentication response).

For example, in the example of the evaluation item "written function 1" illustrated in FIG. 7, which is a function to be evaluated, the attack procedure is as follows: Invalidate a CAN message including a memory clear instruction sent from the rewriting ECU 102 by sending an error frame first. Subsequently (secondly), send an update frame (a CAN message) including a memory clear instruction. Subsequently (thirdly), send an update frame (a CAN message) including fake updated software. Subsequently (fourthly), send an update frame (a CAN message) including a signature for the fake updated software. Note that the attack procedure information of FIG. 7 can include information related to transmission of an update frame indicating a restart instruction subsequent to the information related to transmission of the update frame including the updated software signature.

By sending the attack frames predetermined for each of the evaluation items in the predetermined order in accordance with such attack procedure information, the evaluation apparatus 101 attacks and evaluates the electronic control system 11. For example, in the case where the attack procedure information indicates that an attack frame having a predetermined ID (e.g., an ID for authentication seed or an ID for authentication response, which is the result of authentication) is to be sent after transmission of an error frame, if the receiving unit 201*b* receives a CAN message having the predetermined ID from the CAN bus 20, the evaluation apparatus 101 sends an error frame first. Subsequently, the evaluation apparatus 101 sends an attack frame having the predetermined ID. The predetermined ID may be an update ID predetermined for a software update process (e.g., an ID for a memory clear instruction, an ID for the updated software, an ID for an updated software signature, an ID for a restart instruction).

1.7 Operation Performed by Evaluation System

The operation performed by the evaluation system 10 having the above-described configuration is described below.

An operation example relating to software update performed by the electronic control system 11 when the evaluation apparatus 101 does not send an attack frame in the evaluation system 10 is described first. Thereafter, an operation performed by the evaluation apparatus 101 to evaluate the electronic control system 11 to be evaluated by attacking the electronic control system 11 in accordance with the attack procedure information 105 (a procedure for attack by sending attack frames) is described with reference to an example of the operation for each of the evaluation items (operation examples 1 to 5).

1.7.1 Operation Example for Software Update

Software update (updating of the software in the rewritten ECU 103) performed in the electronic control system 11 when the evaluation apparatus 101 does not send an attack frame is described with reference to the sequence diagram illustrated in FIG. 8. In the example illustrated in FIG. 8, software update is accomplished by the rewriting ECU 102 that initiatively sends a variety of predetermined update frames and the rewritten ECU 103 that performs the processes corresponding to the update frames.

The rewriting ECU 102 sends, to the CAN bus 20, an update frame (a CAN message) including a rewrite mode transition instruction (information instructing transition to the rewrite mode) (step S601).

Upon receiving, from the CAN bus 20, the update frame including the rewrite mode transition instruction, the rewritten ECU 103 sends a CAN message including an authentication seed to the CAN bus 20 (step S602).

Upon receiving the CAN message including the authentication seed, the rewriting ECU 102 generates an authentication key by encrypting the received authentication seed using the key stored in the key storage unit 303 and sends an update frame (a CAN message) including the authentication key to the CAN bus 20 (step S603).

Upon receiving the update frame including the authentication key, the rewritten ECU 103 decrypts the received authentication key by using the key stored in the key storage unit 403 and determines whether the result of decryption is the same as the sent authentication seed. If the rewritten ECU 103 determines that both are the same, the rewritten ECU 103 sends, as the result of authentication, a CAN message indicating rewrite permission to the CAN bus 20. Thus, the rewritten ECU 103 permits the execution of the subsequent update procedure. However, if the rewritten ECU 103 determines that neither are the same, the rewritten ECU 103 sends, as the result of authentication, a CAN message representing rewrite prohibition to the CAN bus 20 and does not permit execution of the subsequent update procedure (step S604). Upon receiving the CAN message including the result of authentication, the rewriting ECU 102 executes the subsequent update procedure if the received CAN message represents rewrite permission as the result of authentication. However, if the received CAN message represents rewrite prohibition, the rewriting ECU 102 does not execute the subsequent update procedure.

Upon receiving the CAN message representing rewrite permission as the result of authentication, the rewriting ECU 102 sends an update frame including a memory clear instruction to the CAN bus 20 (step S605). Upon receiving the update frame including the memory clear instruction, the rewritten ECU 103 deletes the information stored in the program storage unit 404 (the memory content in a region that stores the updated software).

Subsequently, the rewriting ECU 102 sends an update frame including the updated software to the CAN bus 20 (step S606). Note that the update frame may be composed of a plurality of CAN messages. For example, an update frame including the updated software is composed of one or more CAN messages in accordance with the data amount of the updated software. Upon receiving the update frame including the updated software, the rewritten ECU 103 writes the received updated software to the program storage unit 404.

Subsequently, the rewriting ECU 102 sends an update frame including the updated software signature corresponding to the updated software to the CAN bus 20 (step S607). Upon receiving the update frame including the updated software signature, the rewritten ECU 103 writes the received updated software signature to the signature storage unit 402.

Finally, the rewriting ECU 102 sends an update frame indicating a restart instruction to the CAN bus 20 (step S608). Upon receiving the update frame indicating a restart instruction, the rewritten ECU 103 performs a restart operation (reset of the processor). To perform the restart operation, for example, the rewritten ECU 103 determines whether the signature stored in the signature storage unit 402 is valid as the signature of the program (the updated software) stored in the program storage unit 404 by using the signature verification key stored in the key storage unit 403. If the signature is valid, the rewritten ECU 103 resets the processor. When the processor is reset, the processor executes the update software in the program storage unit 404. However, if, as a result of the verification of the signature of the program, the signature is not valid, the rewritten ECU 103 does not perform a restart process for executing the updated software. Note that when, for example, clearing the memory content of the program storage unit 404 in response to the memory clear instruction, the rewritten ECU 103 may store, in a storage medium (e.g., a nonvolatile memory or a hard disk), the original memory content. If the signature relating to the update software is not valid, the rewritten ECU 103 may restore the original memory content in the program storage unit 404.

1.7.2 Operation Example 1 of Evaluation System

Figure 10:
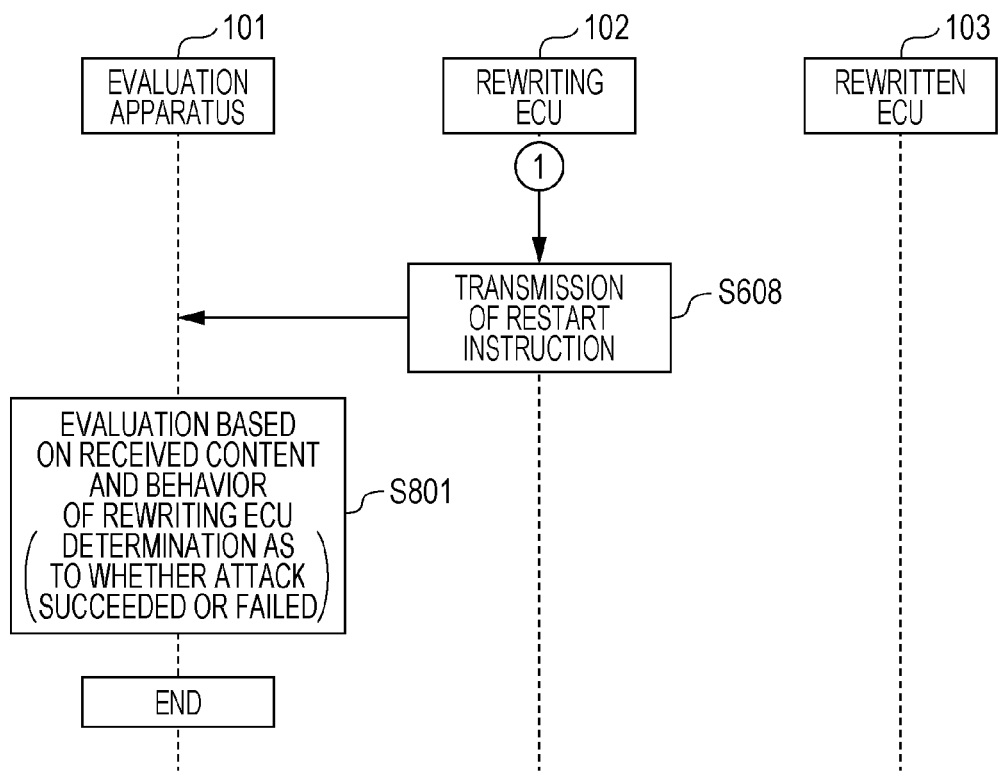
FIG. 10 is a sequence diagram illustrating operation example 1 performed by the evaluation system.

FIGS. 9 and 10 are sequence diagrams illustrating the operation performed by the evaluation system 10 to evaluate the electronic control system 11 (Operation example 1). Note that the sequence diagram illustrated in FIG. 10 is a continuation of the sequence diagram illustrated in FIG. 9. In Operation example 1, the evaluation apparatus 101 performs evaluation relating to the evaluation item "rewriting function 1" illustrated in FIG. 6. In this example, the evaluation apparatus 101 is spoofing the rewritten ECU 103 to attack the rewriting ECU 102 so that the rewriting ECU 102 makes false recognition. In this manner, the security of the electronic control system 11 is evaluated. Operation example 1 is described below with reference to FIGS. 9 and 10.

The rewriting ECU 102 sends an update frame (a CAN message) indicating a rewrite mode transition instruction to the CAN bus 20 (step S601). Upon receiving the update frame including the rewrite mode transition instruction, the rewritten ECU 103 sends a CAN message including an authentication seed to the CAN bus 20 (step S602).

Upon receiving the CAN message from the CAN bus 20, the evaluation apparatus 101 detects that the CAN message including the authentication seed is flowing on the CAN bus 20. Thereafter, the evaluation apparatus 101 sends an error frame before the entire CAN message is received by the rewriting ECU 102 to invalidate the CAN message including the authentication seed sent from the rewritten ECU 103 (step S701). The CAN message including the authentication seed on the CAN bus 20 is overwritten by the error frame and becomes invalid. As a result, the CAN message cannot be received correctly.

Subsequently, the evaluation apparatus 101 sends a CAN message including a fake authentication seed to the CAN bus 20 (step S702). The signal monitoring unit 204 of the evaluation apparatus 101 successively stores, in the storage unit 208, the results of the sequential monitoring of the behavior of the rewriting ECU 102 in step S702 and the subsequent steps. Upon receiving the CAN message including the fake authentication seed, the rewriting ECU 102 generates an authentication key by encrypting the received authentication seed using the key stored in the key storage unit 303. Thereafter, the rewriting ECU 102 sends an update frame (a CAN message) including the generated authentication key to the CAN bus 20 (step S603).

Upon receiving the update frame including the authentication key, the evaluation apparatus 101 sends, to the CAN bus 20, a CAN message representing rewrite permission as the result of authentication regardless of the validity of the received authentication key (step S703).

Upon receiving the CAN message representing rewrite permission as the result of authentication, the rewriting ECU 102 sends an update frame including a memory clear instruction to the CAN bus 20 (step S605). Upon receiving the update frame including the memory clear instruction, the evaluation apparatus 101 stores the content of the update frame including the received memory clear instruction in the storage unit 208 by using the CAN bus monitoring unit 203.

Subsequently, the rewriting ECU 102 sends an update frame including the updated software to the CAN bus 20 (step S606). Upon receiving the update frame including the updated software, the evaluation apparatus 101 stores the received updated software in the storage unit 208 by using the CAN bus monitoring unit 203.

Subsequently, the rewriting ECU 102 sends, to the CAN bus 20, an update frame including an updated software signature corresponding to the updated software (step S607). Upon receiving the update frame including the updated software signature, the rewritten ECU 103 stores the received updated software signature in the storage unit 208 by using the CAN bus monitoring unit 203.

Subsequently, the rewriting ECU 102 sends an update frame indicating a restart instruction to the CAN bus 20 (step S608). Upon receiving the update frame indicating the restart instruction, the evaluation apparatus 101 stores, in the storage unit 208, the content of the update frame indicating the received restart instruction by using the CAN bus monitoring unit 203.

Finally, the evaluation apparatus 101 performs evaluation by examining the information about the memory content stored in the storage unit 208 and received from the CAN bus 20 and the information about the operation performed by the rewriting ECU 102 in step S702 and the subsequent steps (step S801). That is, the evaluation apparatus 101 compares the received memory content and the operation performed by the rewriting ECU 102 with the expected values of the attack and, thus, evaluates the security of the electronic control system 11 (determines whether the attack succeeded or failed). For example, the evaluation apparatus 101 determines that the attack is successful if the examined received content and the examined operation performed by the rewriting ECU 102 are the same as the expected values of the attack (the same operation as in the update procedure, such as transmission of the update frame to the rewritten ECU 103). Even when the evaluation apparatus 101 does not receive the update frame or the like indicating a restart instruction, the evaluation apparatus 101 can perform evaluation in step S801 after a predetermined period of time has elapsed (e.g., after a predetermined period of time has elapsed since transmission of the CAN message representing the result of authentication in step S703). Accordingly, even when the attack fails (e.g., in the case where the CAN message sent from the evaluation apparatus 101 in step S703 is invalidated by, for example, transmission of an error frame from the security ECU 104), evaluation in step S801 is available. In addition, the evaluation apparatus 101 may determine whether the attack succeeded or failed on the basis of the expected value of the attack by using only one of the result of monitoring performed by the CAN bus monitoring unit 203 and the result of monitoring performed by the signal monitoring unit 204. Furthermore, in step S801, the evaluation apparatus 101 may evaluate the security of the electronic control system 11 to be evaluated in any level of detail. For example, in addition to success or failure of the whole attack, the evaluation apparatus 101 may determine whether an individual attack, such as transmission of an attack frame, succeeded or may determine whether each of a variety of defense functions was effective and determine the defense level of the function.

1.7.3 Operation Example 2 of Evaluation System

Figure 11:
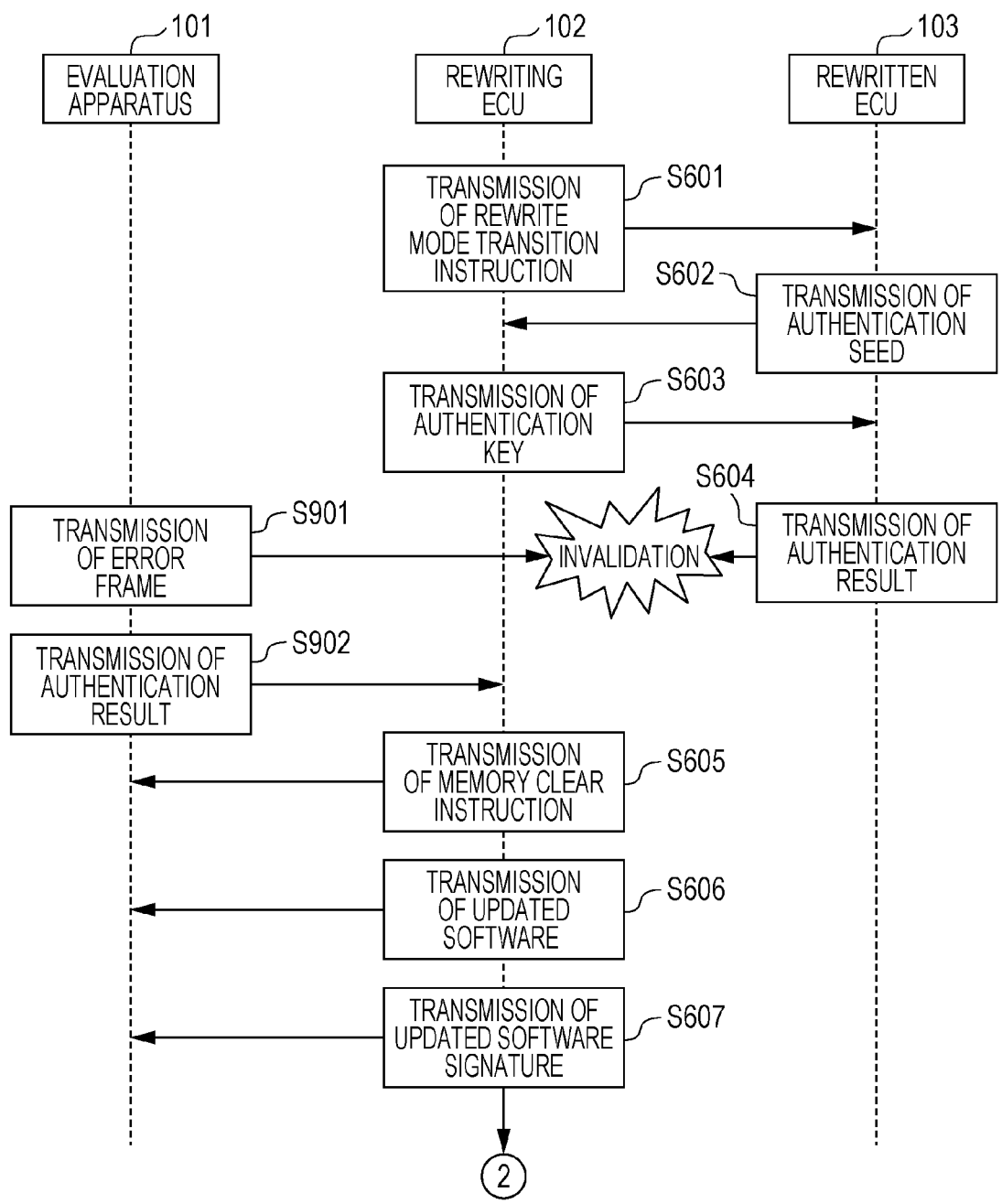
FIG. 11 is a sequence diagram illustrating operation example 2 performed by the evaluation system.
Figure 12:
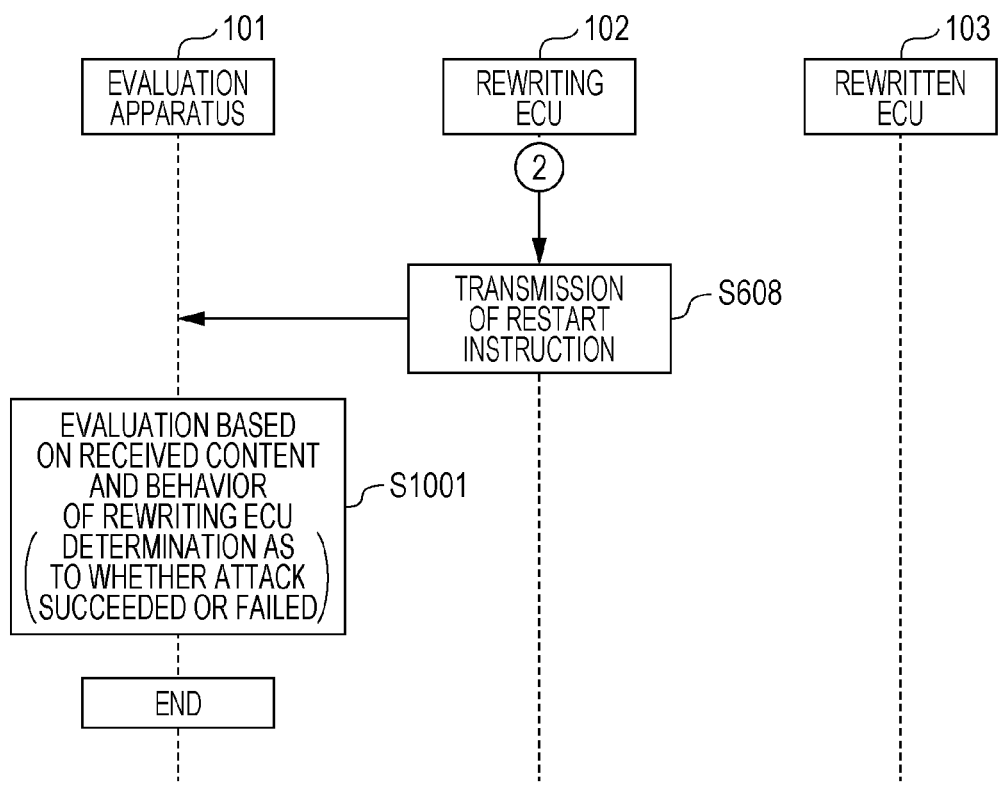
FIG. 12 is a sequence diagram illustrating operation example 2 performed by the evaluation system.

FIGS. 11 and 12 are sequence diagrams illustrating the operation performed by the evaluation system 10 to evaluate the electronic control system 11 (operation example 2). Note that the sequence diagram illustrated in FIG. 12 is a continuation of the sequence diagram illustrated in FIG. 11. In operation example 2, the evaluation apparatus 101 performs evaluation relating to the evaluation item "rewriting function 2" illustrated in FIG. 6. In this example, the evaluation apparatus 101 is spoofing the rewritten ECU 103 to attack the rewriting ECU 102 so that the rewriting ECU 102 makes false recognition. In this manner, the security of the electronic control system 11 is evaluated. Operation example 2 is described below with reference to FIGS. 11 and 12.

The rewriting ECU 102 sends, to the CAN bus 20, an update frame indicating a rewrite mode transition instruction (step S601). Upon receiving the update frame including the rewrite mode transition instruction, the rewritten ECU 103 sends a CAN message including an authentication seed to the CAN bus 20 (step S602). Upon receiving the CAN message including the authentication seed, the rewriting ECU 102 generates an authentication key on the basis of the received authentication seed and sends an update frame including the authentication key to the CAN bus 20 (step S603). Upon receiving the update frame including the authentication key, the rewritten ECU 103 sends, to the CAN bus 20, a CAN message related to the result of authentication based on the received authentication key (step S604).

Upon receiving the CAN message related to the result of authentication via the CAN bus 20, the evaluation apparatus 101 detects that the CAN message related to the result of authentication is flowing on the CAN bus 20. Thereafter, the evaluation apparatus 101 sends an error frame before the entire CAN message is received by the rewriting ECU 102 to invalidate the CAN message including the result of authentication and sent from the rewritten ECU 103 (step S901). The CAN message related to the result of authentication on the CAN bus 20 is overwritten by the error frame and becomes invalid. As a result, the CAN message cannot be received correctly.

Subsequently, the evaluation apparatus 101 sends, to the CAN bus 20, a CAN message representing rewriting permission, which is a fake result of authentication (step S902). The signal monitoring unit 204 of the evaluation apparatus 101 successively stores, in the storage unit 208, the results of the sequential monitoring of the behavior of the rewriting ECU 102 in step S902 and the subsequent steps. Upon receiving the CAN message representing rewriting permission which is the fake result of authentication, the rewriting ECU 102 performs the subsequent updating procedure. That is, the rewriting ECU 102 sends an update frame including a memory clear instruction to the CAN bus 20 (step S605). Upon receiving the update frame including the memory clear instruction, the evaluation apparatus 101 stores, in the storage unit 208, the content of the received update frame including the memory clear instruction by using the CAN bus monitoring unit 203.

Subsequently, the rewriting ECU 102 sends an update frame including the updated software to the CAN bus 20 (step S606). Upon receiving the update frame including the updated software, the evaluation apparatus 101 stores the received updated software in the storage unit 208 by using the CAN bus monitoring unit 203.

Subsequently, the rewriting ECU 102 sends, to the CAN bus 20, an update frame including an updated software signature corresponding to the updated software (step S607). Upon receiving the update frame including the updated software signature, the rewritten ECU 103 stores the received updated software signature in the storage unit 208 by using the CAN bus monitoring unit 203.

Subsequently, the rewriting ECU 102 sends an update frame indicating a restart instruction to the CAN bus 20 (step S608). Upon receiving the update frame indicating the restart instruction, the evaluation apparatus 101 stores, in the storage unit 208, the content of the update frame indicating the received restart instruction by using the CAN bus monitoring unit 203.

Finally, the evaluation apparatus 101 performs evaluation by examining the information about the content received via the CAN bus 20 and stored in the storage unit 208 and the information about the operation performed by the rewriting ECU 102 in step S902 and the subsequent steps (step S1001). That is, like the above-described evaluation performed in step S801, the evaluation apparatus 101 evaluates the security of the electronic control system 11 (e.g., determines whether the attack succeeded or failed) by comparing the received content and the operation performed by the rewriting ECU 102 with the expected values of the attack.

1.7.4 Operation Example 3 of Evaluation System

Figure 13:
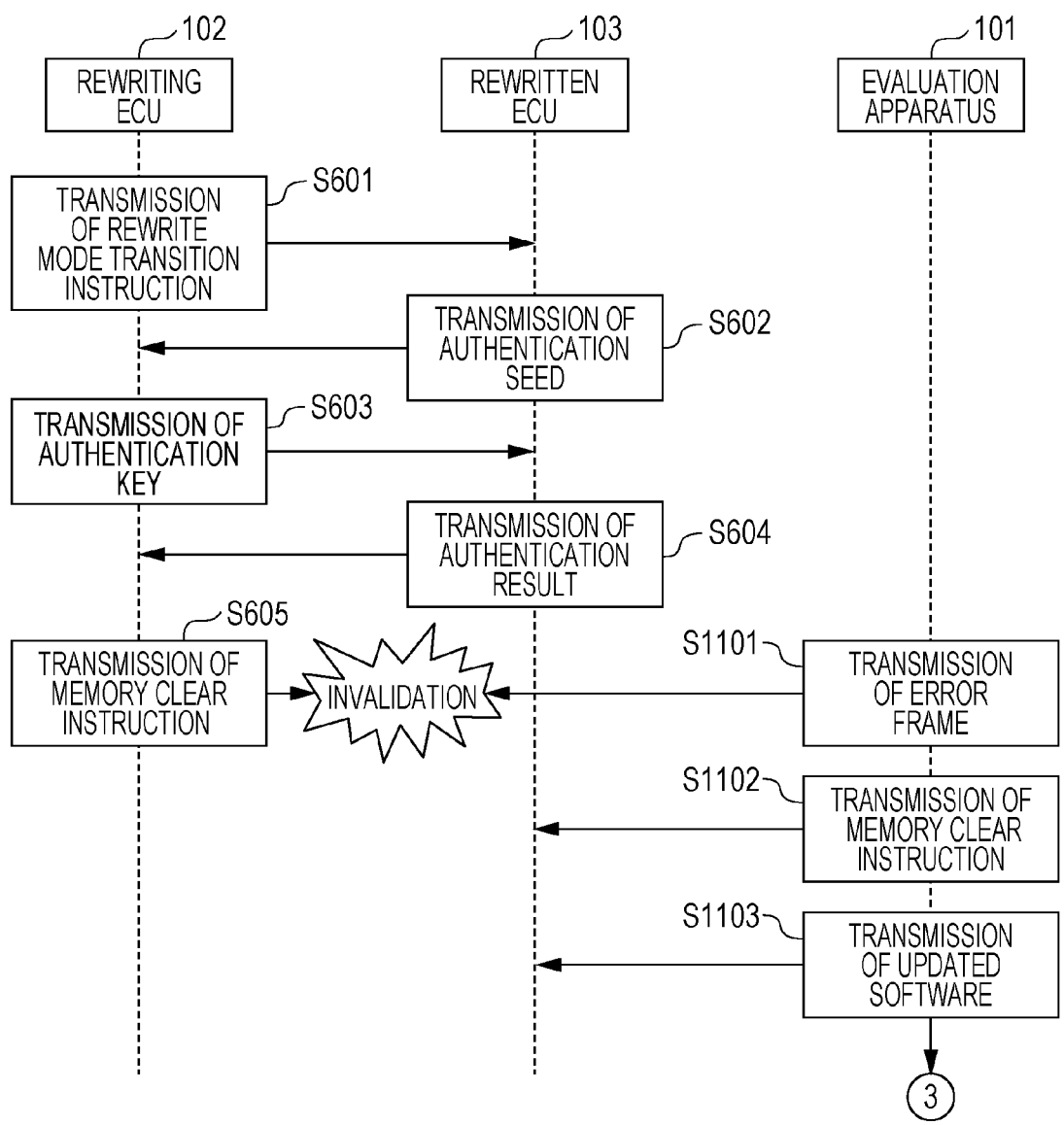
FIG. 13 is a sequence diagram illustrating operation example 3 performed by the evaluation system.
Figure 14:
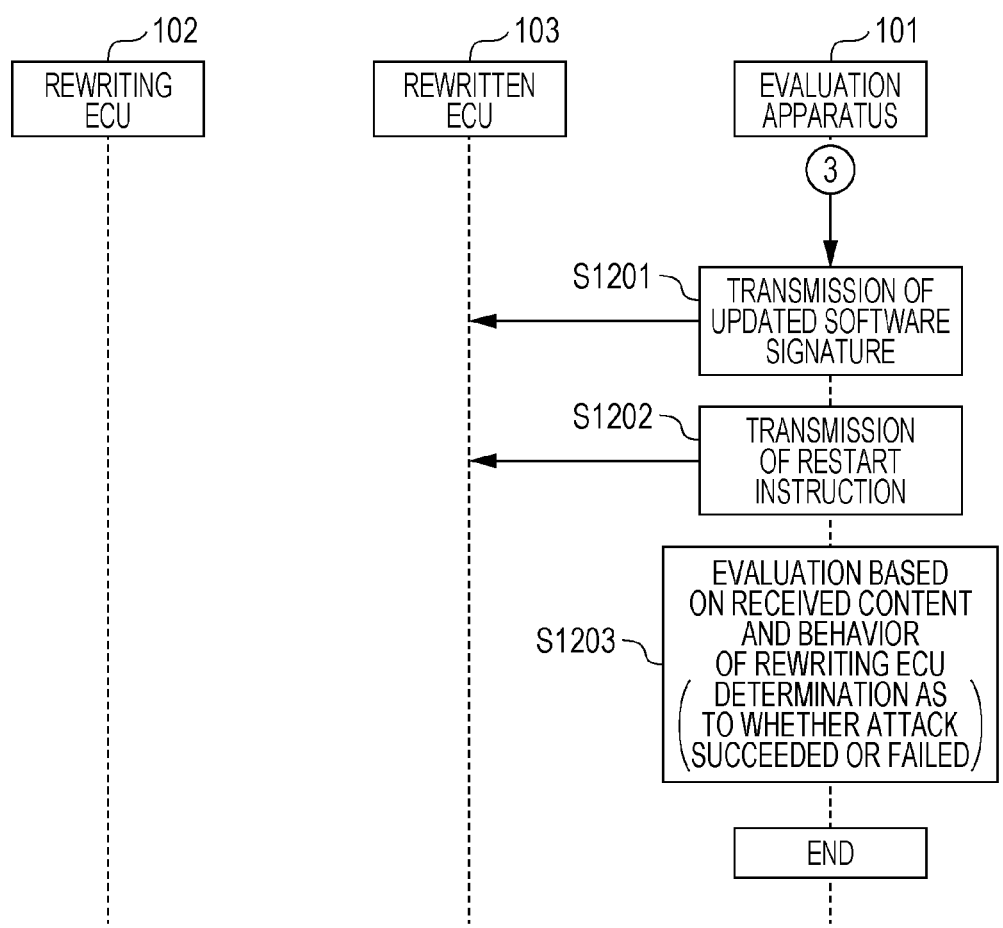
FIG. 14 is a sequence diagram illustrating operation example 3 performed by the evaluation system.

FIGS. 13 and 14 are sequence diagrams illustrating the operation (operation example 3) performed by the evaluation system 10 to evaluate the electronic control system 11. Note that the sequence diagram illustrated in FIG. 14 is a continuation of the sequence diagram illustrated in FIG. 13. In operation example 3, the evaluation apparatus 101 performs evaluation relating to the evaluation item "rewritten function 1" illustrated in FIG. 7. In this example, the evaluation apparatus 101 is spoofing the rewriting ECU 102 to attack the rewritten ECU 103 so that the rewritten ECU 103 makes false recognition. In this manner, the security of the electronic control system 11 is evaluated. Operation example 3 is described below with reference to FIGS. 13 and 14.

The rewriting ECU 102 sends an update frame indicating a rewrite mode transition instruction to the CAN bus 20 (step S601). Upon receiving the update frame including the rewrite mode transition instruction, the rewritten ECU 103 sends a CAN message including an authentication seed to the CAN bus 20 (step S602). Upon receiving the CAN message including the authentication seed, the rewriting ECU 102 generates an authentication key on the basis of the received authentication seed and sends an update frame including the authentication key to the CAN bus 20 (step S603). Upon receiving the update frame including the authentication key, the rewritten ECU 103 sends a CAN message representing rewriting permission to the CAN bus 20 as a result of authentication based on the received authentication key (step S604). Upon receiving the CAN message representing rewrite permission as the result of authentication, the rewriting ECU 102 sends an update frame including the memory clear instruction to the CAN bus 20 (step S605).

Upon receiving the update frame including the memory clear instruction via the CAN bus 20, the evaluation apparatus 101 detects that the update frame including the memory clear instruction is flowing on the CAN bus 20. Thereafter, the evaluation apparatus 101 sends an error frame before the entire CAN message is received by the rewritten ECU 103 to invalidate the update frame sent from the rewriting ECU 102 (step S1101). The update frame including the memory clear instruction on the CAN bus 20 is overwritten by the error frame and becomes invalid. As a result, the update frame cannot be received correctly.

Subsequently, the evaluation apparatus 101 sends an update frame including a memory clear instruction to the CAN bus 20 (step S1102). The CAN bus monitoring unit 203 and the signal monitoring unit 204 of the evaluation apparatus 101 sequentially store, in the storage unit 208, the results of the sequential monitoring of the operation or response of the rewritten ECU 103 in step S1102 and the subsequent steps. For example, the signal monitoring unit 204 stores, in the storage unit 208, the operation performed by the rewritten ECU 103 after receiving the update frame including the memory clear instruction (e.g., the operation to clear the content stored in the program storage unit 404).

Subsequently, the evaluation apparatus 101 sends an update frame including the updated software to the CAN bus 20 (step S1103). The updated software does not necessarily have to be authorized content. The updated software may be fake updated software. The evaluation apparatus 101 stores, in the storage unit 208, the operation or response of the rewritten ECU 103 after receiving the update frame including the updated software.

Subsequently, the evaluation apparatus 101 sends, to the CAN bus 20, an update frame including an updated software signature corresponding to the updated software (step S1201). The evaluation apparatus 101 stores, in the storage unit 208, the operation performed by the rewritten ECU 103 and the response from the rewritten ECU 103 after receiving the update frame including the updated software signature. Note that the evaluation apparatus 101 may prestore the updated software, the updated software signature, and information such as a key required to create the signature (information necessary for update processing).

Subsequently, the evaluation apparatus 101 sends an update frame indicating a restart instruction to the CAN bus 20 (step S1202). The evaluation apparatus 101 stores, in the storage unit 208, the operation performed by the rewritten ECU 103 (e.g., information as to whether a restart operation has been performed) or responses from the rewritten ECU 103 after receiving the update frame indicating the restart instruction.

Finally, the evaluation apparatus 101 performs evaluation by examining the information about the content stored in the storage unit 208 and received from the CAN bus 20 and the information about the operation performed by the rewritten ECU 103 in step S1102 and the subsequent steps (step S1203). That is, the evaluation apparatus 101 compares the received memory content and the operation performed by the rewritten ECU 103 with the expected values of the attack and, thus, evaluates the security of the electronic control system 11 (determines whether the attack succeeded or failed). For example, the evaluation apparatus 101 determines that the attack is successful if the examined received content and the examined operation performed by the rewritten ECU 103 are the same as the expected values of the attack (the same operation as that performed when the update frame is received from the rewriting ECU 102). The evaluation apparatus 101 may determine whether the attack succeeded or failed by using only one of the result of monitoring performed by the CAN bus monitoring unit 203 and the result of monitoring performed by the signal monitoring unit 204. In addition, in step S1203, the evaluation apparatus 101 may evaluate the security of the electronic control system 11 to be evaluated in any level of detail. For example, in addition to success or failure of the whole attack, the evaluation apparatus 101 may determine whether an individual attack, such as transmission of an attack frame, succeeded or may determine whether each of a variety of defense functions was effective and determine the defense level of the function.

1.7.5 Operation Example 4 of Evaluation System

Figure 15:
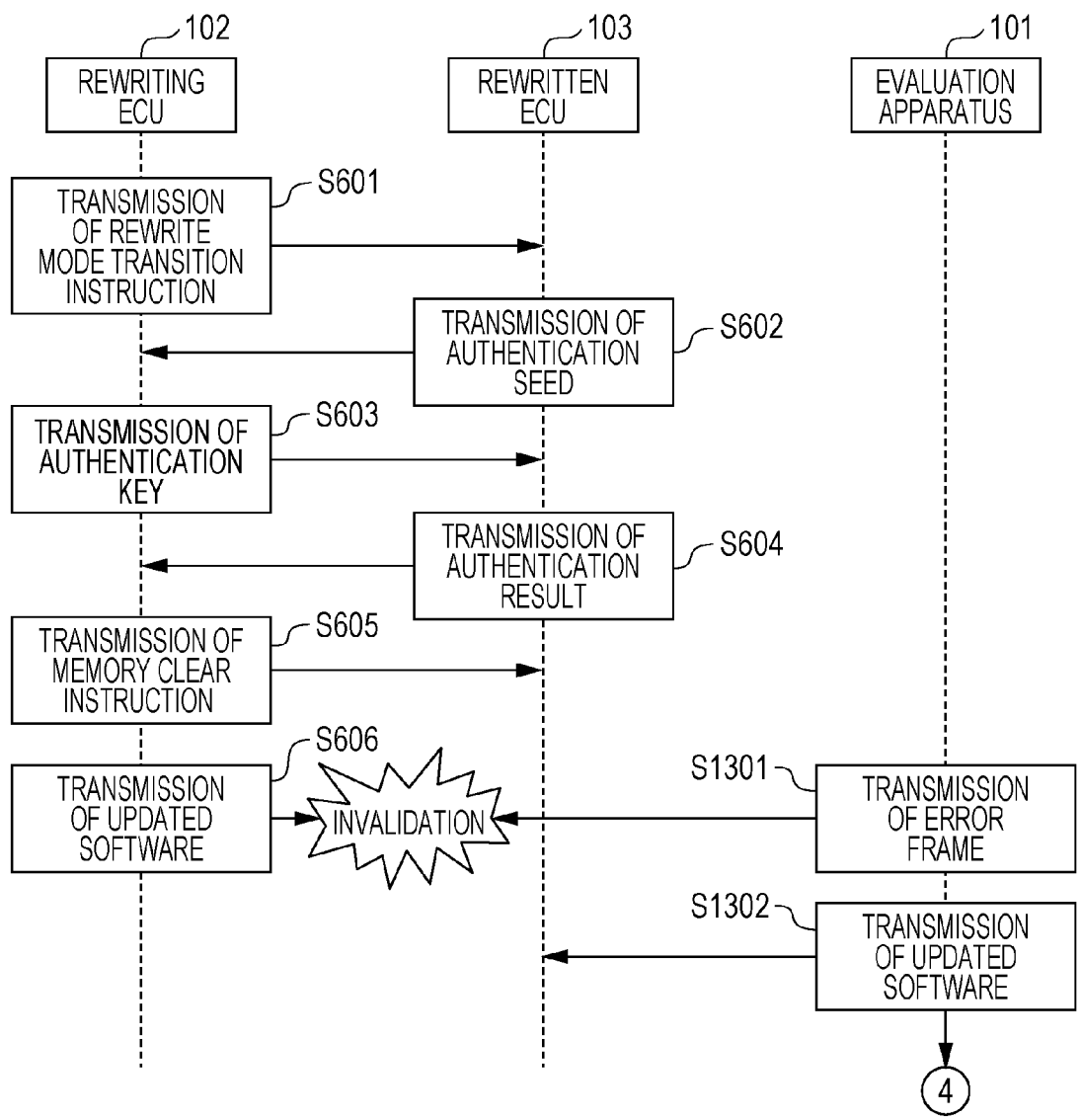
FIG. 15 is a sequence diagram illustrating operation example 4 performed by the evaluation system.
Figure 16:
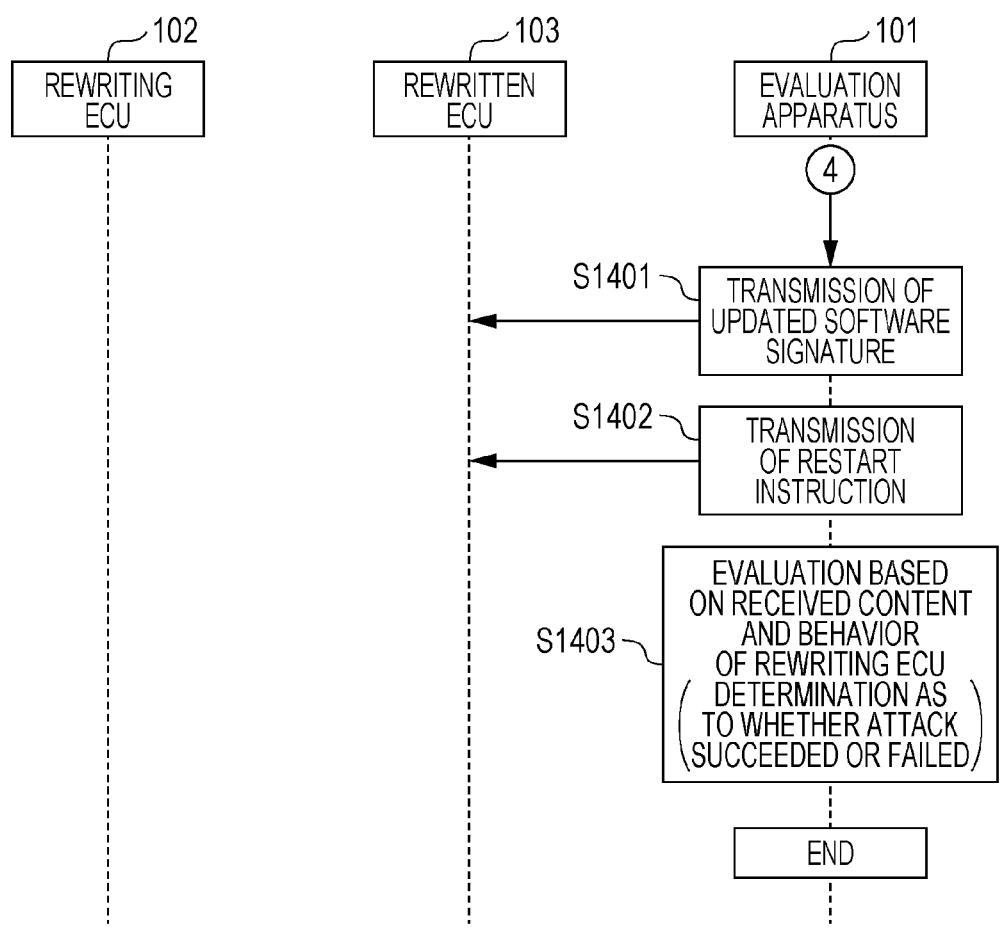
FIG. 16 is a sequence diagram illustrating operation example 4 performed by the evaluation system.

FIGS. 15 and 16 are sequence diagrams illustrating the operation performed by the evaluation system 10 to evaluate the electronic control system 11 (operation example 4). Note that the sequence diagram illustrated in FIG. 16 is a continuation of the sequence diagram illustrated in FIG. 15. In operation example 4, the evaluation apparatus 101 performs evaluation relating to the evaluation item "rewritten function 2" illustrated in FIG. 7. In this example, the evaluation apparatus 101 is spoofing the rewriting ECU 102 to attack the rewritten ECU 103 so that the rewritten ECU 103 makes false recognition. In this manner, the security of the electronic control system 11 is evaluated. Operation example 4 is described below with reference to FIGS. 15 and 16.

The rewriting ECU 102 sends an update frame indicating a rewrite mode transition instruction to the CAN bus 20 (step S601). Upon receiving the update frame including the rewrite mode transition instruction, the rewritten ECU 103 sends a CAN message including an authentication seed to the CAN bus 20 (step S602). Upon receiving the CAN message including the authentication seed, the rewriting ECU 102 generates an authentication key on the basis of the received authentication seed and sends an update frame including the authentication key to the CAN bus 20 (step S603). Upon receiving the update frame including the authentication key, the rewritten ECU 103 sends, to the CAN bus 20, a CAN message representing rewriting permission as the result of authentication based on the received authentication key (step S604). Upon receiving the CAN message representing rewriting permission as the result of authentication, the rewriting ECU 102 sends, to the CAN bus 20, an update frame including a memory clear instruction (step S605). Upon receiving the update frame including the memory clear instruction, the rewritten ECU 103 clears the memory content in the program storage unit 404 (the content in a region for storing the updated software).

Subsequently, the rewriting ECU 102 sends an update frame including the updated software to the CAN bus 20 (step S606).

Upon receiving the update frame including the updated software via the CAN bus 20, the evaluation apparatus 101 detects that the update frame including the updated software is flowing on the CAN bus 20. Thereafter, the evaluation apparatus 101 sends an error frame before the entire CAN message is received by the rewritten ECU 103 to invalidate the update frame sent from the rewriting ECU 102 (step S1301). The update frame including the updated software on the CAN bus 20 is overwritten by the error frame and becomes invalid. As a result, the update frame cannot be received correctly.

Subsequently, the evaluation apparatus 101 sends an update frame including fake updated software to the CAN bus 20 (step S1302). The CAN bus monitoring unit 203 and the signal monitoring unit 204 of the evaluation apparatus 101 sequentially store, in the storage unit 208, the results of the sequential monitoring of the operation or response of the rewritten ECU 103 performed in step S1302 and the subsequent steps. For example, the signal monitoring unit 204 stores, in the storage unit 208, the operation performed by the rewritten ECU 103 after receiving the update frame including fake updated software on the basis of, for example, a debug output signal output from the rewritten ECU 103 (e.g., an operation to store the fake updated software in the program storage unit 404).

Subsequently, the evaluation apparatus 101 sends, to the CAN bus 20, an update frame including a fake updated software signature corresponding to the fake updated software (step S1401). The evaluation apparatus 101 stores, for example, the operation or the response of the rewritten ECU 103 in the storage unit 208 after receiving the update frame including the fake updated software signature.

Subsequently, the evaluation apparatus 101 sends an update frame indicating a restart instruction to the CAN bus 20 (step S1402). The evaluation apparatus 101 stores, in the storage unit 208, the operation or the response of the rewritten ECU 103 after receiving the update frame indicating the restart instruction.

Finally, the evaluation apparatus 101 performs evaluation by examining the information about the content received via the CAN bus 20 and stored in the storage unit 208 and the information about the operation performed by the rewritten ECU 103 in step S1302 and the subsequent steps (step S1403). That is, like the above-described evaluation performed in step S1203, the evaluation apparatus 101 evaluates the security of the electronic control system 11 (e.g., determines whether the attack succeeded or failed) by comparing the received content and the operation performed by the rewritten ECU 103 with the expected values of the attack.

1.7.6 Operation Example 5 of Evaluation System

Figure 17:
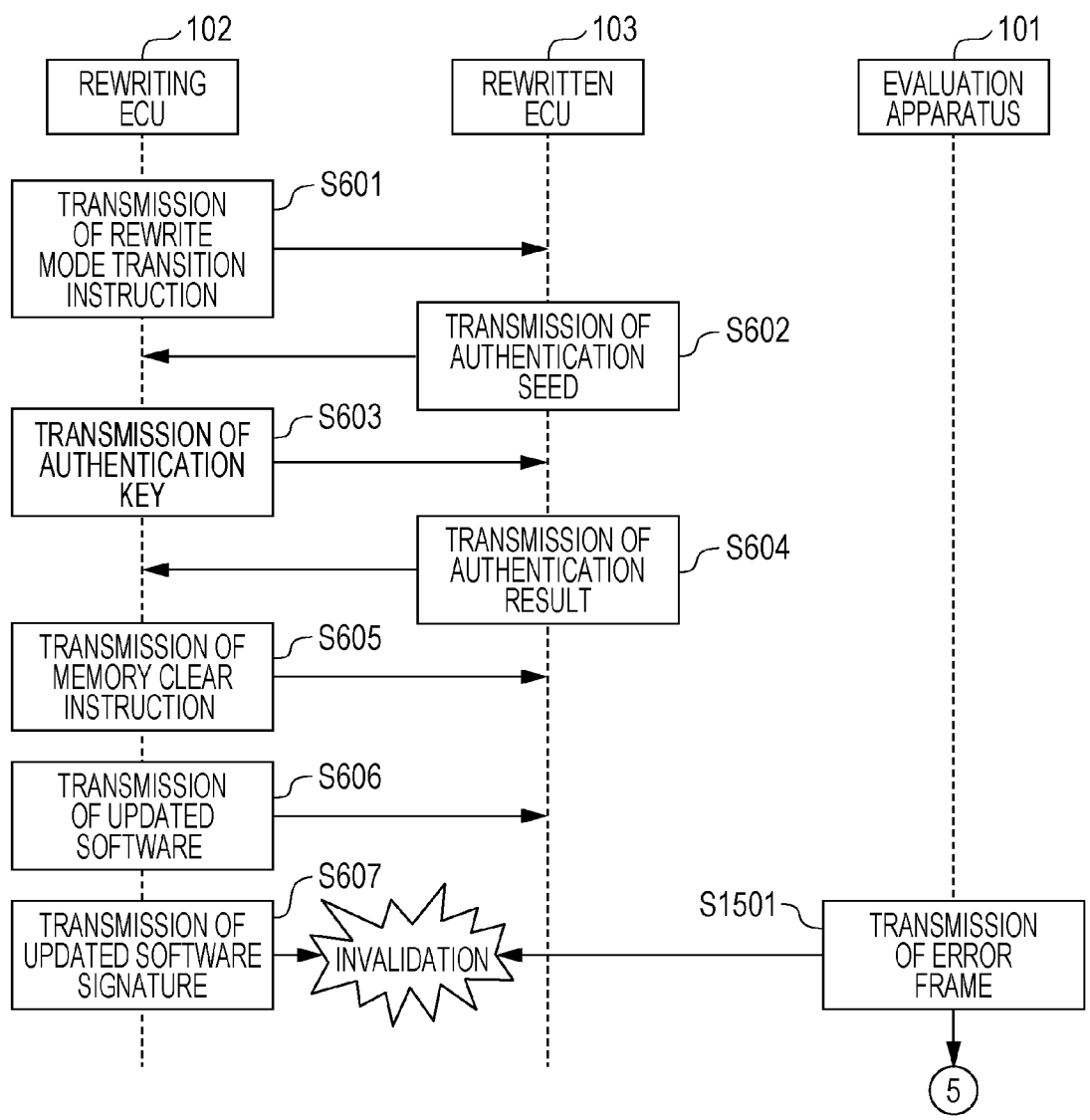
FIG. 17 is a sequence diagram illustrating operation example 5 performed by the evaluation system.
Figure 18:
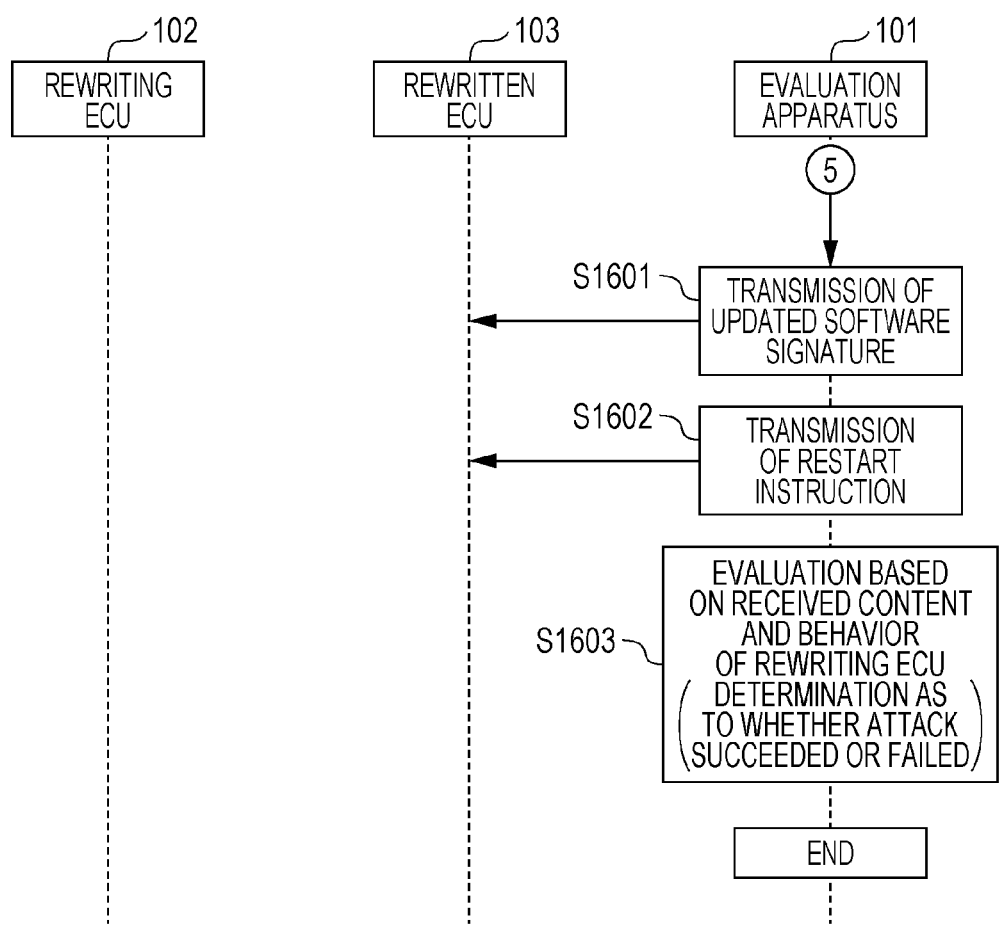
FIG. 18 is a sequence diagram illustrating operation example 5 performed by the evaluation system.

FIGS. 17 and 18 are sequence diagrams illustrating the operation performed by the evaluation system 10 to evaluate the electronic control system 11 (operation example 5). Note that the sequence diagram illustrated in FIG. 18 is a continuation of the sequence diagram illustrated in FIG. 17. In operation example 5, the evaluation apparatus 101 performs evaluation relating to the evaluation item "rewritten function 3" illustrated in FIG. 7. In this example, the evaluation apparatus 101 is spoofing the rewriting ECU 102 to attack the rewritten ECU 103 so that the rewritten ECU 103 makes false recognition. In this manner, the security of the electronic control system 11 is evaluated. Operation example 5 is described below with reference to FIGS. 17 and 18.

The rewriting ECU 102 sends an update frame indicating a rewrite mode transition instruction to the CAN bus 20 (step S601). Upon receiving the update frame including the rewrite mode transition instruction, the rewritten ECU 103 sends a CAN message including an authentication seed to the CAN bus 20 (step S602). Upon receiving the CAN message including the authentication seed, the rewriting ECU 102 generates an authentication key on the basis of the received authentication seed and sends the update frame including the authentication key to the CAN bus 20 (step S603). Upon receiving the update frame including the authentication key, the rewritten ECU 103 sends a CAN message representing rewriting permission to the CAN bus 20 as the result of authentication on the basis of the received authentication key (step S604). Upon receiving the CAN message representing rewriting permission as the result of authentication, the rewriting ECU 102 sends an update frame including a memory clear instruction to the CAN bus 20 (step S605). Upon receiving the update frame including the memory clear instruction, the rewritten ECU 103 clears the stored content (the content of the region for storing the updated software) in the program storage unit 404. Thereafter, the rewriting ECU 102 sends an update frame including updated software to the CAN bus 20 (step S606). Upon receiving the update frame including the updated software, the rewritten ECU 103 writes the received updated software to the program storage unit 404.

Subsequently, the rewriting ECU 102 sends an update frame including an updated software signature corresponding to the updated software to the CAN bus 20 (step S607).

Upon receiving the update frame including the updated software signature via the CAN bus 20, the evaluation apparatus 101 detects that the update frame including the updated software signature is flowing on the CAN bus 20. Thereafter, the evaluation apparatus 101 sends an error frame before the entire CAN message is received by the rewritten ECU 103 to invalidate the update frame sent from the rewriting ECU 102 (step S1501). The update frame including the updated software signature on the CAN bus 20 is overwritten by the error frame and becomes invalid. As a result, the update frame cannot be received correctly.

Subsequently, the evaluation apparatus 101 sends, to the CAN bus 20, an update frame including a fake updated software signature corresponding to the updated software (step S1601). The evaluation apparatus 101 stores, in the storage unit 208, the operation and the response, for example, of the rewritten ECU 103 after receiving the update frame including the fake updated software signature.

Subsequently, the evaluation apparatus 101 sends an update frame indicating a restart instruction to the CAN bus 20 (step S1602). The evaluation apparatus 101 stores, in the storage unit 208, the operation or response of the rewritten ECU 103 after receiving the update frame indicating the restart instruction.

Finally, the evaluation apparatus 101 performs evaluation by examining the information about the content stored in the storage unit 208 and received via the CAN bus 20 and the information about the operation performed by the rewritten ECU 103 in step S1601 and the subsequent steps (step S1603). That is, as in the above-described evaluation performed in step S1203, the evaluation apparatus 101 compares the received content and the operation performed by the rewritten ECU 103 with the expected values of the attack and, thus, evaluates the security of the electronic control system 11 (e.g., determines whether the attack succeeded or failed).

Modifications

While, as described above, the first embodiment has been described as an example of the technique according to the present disclosure, the technique according to the present disclosure is not limited thereto. The technique according to the present disclosure is applicable to embodiments in which change, substitution, addition, and removal are made as needed. For example, the following modifications are also included in an aspect of the present disclosure.

(1) While the above embodiment has been described with reference to an example in which the evaluation apparatus 101 is spoofing the rewriting ECU 102 or the rewritten ECU 103 and launches an attack in relation to the software update processing in the electronic control system 11, the evaluation apparatus 101 may be spoofing another ECU and launch an attack. Alternatively, the evaluation apparatus 101 may launch an attack by sending an error frame and a CAN message irrelevant to the update processing.

(2) In the above-described electronic control system 11, the various types of ECUs are real ECUs. However, the various types of ECUs in the electronic control system 11 to be evaluated by the evaluation system 10 may be simulated ECUs that simulate the various types of ECUs (e.g., a computer that executes simulation software that simulates, for example, the functions and behaviors of the ECUs) instead of real ECUs (e.g., ECUs mounted on an evaluation board or ECUs in production). In the case where the ECUs are simulated ones, the evaluation apparatus 101 may monitor the operations of the ECUs by observing a change in predetermined data (e.g., content of a predetermined memory region of the computer or output content) relating to the simulation software in the computer.

(3) While the above embodiment has been described with reference to the example in which the evaluation apparatus 101 is a single apparatus connected to the CAN bus 20, the evaluation apparatus 101 may separate into a plurality of housings, for example, a transmission apparatus that sends attack frames in accordance with the attack procedure information 105 and a monitoring apparatus that monitors, for example, CAN messages flowing on the CAN bus 20, the memory content of ECUs connected to the CAN bus 20, and signals output to the signal lines. In addition, the monitoring apparatus or the monitoring unit 200 may monitor any one of the ECUs connected to the CAN bus 20. Furthermore, the monitoring apparatus or the monitoring unit 200 may employ any method for monitoring the ECUs. For example, the monitoring apparatus or the monitoring unit 200 may directly monitor the ECUs by using a dedicated signal line connected to the ECUs. Alternatively, the monitoring apparatus or the monitoring unit 200 may indirectly monitor the ECUs by using CAN messages. Still alternatively, the monitoring apparatus or the monitoring unit 200 may indirectly monitor the ECUs by using the state of the vehicle that may change in accordance with the operations performed by the ECUs.

(4) While the above embodiment has been described with reference to the electronic control system 11 including an in-vehicle network using the CAN bus 20 as an example of a target to be evaluated by the evaluation system 10, a network over which the evaluation apparatus 101 of the evaluation system 10 sends an attack frame and which the evaluation apparatus 101 monitors is not limited to an in-vehicle network. In addition, the network may be a network other than the CAN bus 20 on which communication using the CAN protocol is performed. For example, the evaluation system 10 may evaluate a network for a robot or an industrial device or other network communication systems. Furthermore, the CAN protocol may be a broad CAN protocol including a derivative protocol, such as CANOpen for use in, for example, an embedded system in automation systems, TTCAN (Time-Triggered CAN), or CANFD (CAN with Flexible Data Rate). In addition, the electronic control system (the network communication system) to be evaluated may employ a communication protocol other than the CAN protocol, such as Ethernet (registered trademark), MOST (registered trademark), FlexRay (registered trademark), or LIN (Local Interconnect Network). Furthermore, a system including a composite network formed by combining networks which comply with a variety of protocols may be evaluated, and the evaluation apparatus 101 may perform attacks and monitoring on the network. The evaluation apparatus 101 can perform evaluation in the above-described network by sending attack frames including an invalidation frame that invalidates a frame sent from another node (e.g., an error frame in the case of CAN). The invalidation frame may be any frame that invalidates a frame sent from another node by, for example, overwriting the frame. The invalidation is to change the state of a frame from the normal state in order to prevent proper reception of the frame. For example, a frame may be modified by changing one or more bits with overwriting. Alternatively, a frame may be invalidated by using a method provided by the communication protocol without modifying the frame itself (e.g., by adding information indicating that the preceding frame is invalid).

(5) In the above embodiment, after sending an error frame in order to invalidate a CAN message sent from an ECU to be spoofed, the evaluation apparatus 101 performs the entire operation for the updating processing to be performed by the ECU to be spoofed. However, for example, the evaluation apparatus 101 may send only some of a plurality of CAN messages to be sent by the ECU to be spoofed.

(6) While the above embodiment has been described with reference to the example in which the attack procedure information 105 defines the order in which a plurality of attack frames including error frames and CAN messages are sent, the attack procedure information 105 may define only transmission of one or more error frames. For example, the attack procedure information 105 may specify transmission timing or the transmission interval of the error frame or the transmission conditions (e.g., conditions related to an ID to which a CAN message is to be sent on the bus). Even in such a case, the evaluation apparatus 101 can evaluate the security of the electronic control system 11 by examining, for example, the behavior of the ECU for transmission of the error frame.

(7) To evaluate the security to be evaluated (e.g., the attack tolerance), the evaluation apparatus 101 may perform evaluation, such as determination as to whether the attack tolerance is present, on the basis of the number and the percent of unauthorized CAN messages that have broken through the defense. Note that the evaluation apparatus 101 may use a threshold value that defines an upper limit of the number or the percent of unauthorized CAN messages in order to determine whether the attack tolerance is present. The threshold value may be set to any desired value for the evaluation apparatus 101 or a value that is changed (adjusted) in accordance with, for example, the result of evaluation if evaluation is repeatedly performed. Furthermore, the evaluation apparatus 101 may calculate the success rate of attacks (e.g., the frequency of successful attacks). In this way, the evaluation apparatus 101 may evaluate whether, for example, each of the plurality of defense functions operates or to what extent they operate effectively, in addition to selectively determining whether the attack succeeded or failed or whether the defense succeeded or failed. In addition, in the evaluation apparatus 101, the transmitting unit 201a may repeat the attack pattern for sending a plurality of frames to the CAN bus 20 in the transmission order indicated by the attack procedure information 105 a plurality of times, and the evaluation unit 206 may perform evaluation so that result of evaluation varies depending on the presence/absence of a change in the result of monitoring performed by the monitoring unit 200. For example, when the evaluation apparatus 101 repeats transmission of a fake authentication seed or transmission of a fake authentication key a plurality of times, the evaluation apparatus 101 may determine whether the attack is successful on the basis of whether the responses can be received a predetermined number of times or more. Note that the result of evaluation performed by the evaluation unit 206 of the evaluation apparatus 101 may be stored in a storage medium, such as a memory, by the evaluation apparatus 101. In addition, the result of evaluation may be output to the outside of the evaluation apparatus 101 (for example, the result of evaluation may be displayed, or the information regarding the result of evaluation may be transmitted). For example, the evaluation unit 206 may output, as the result of evaluation, the information as to whether the electronic control system to be evaluated has attack tolerance.

(8) The security function including the security ECU 104 in the electronic control system 11 to be evaluated may store log information regarding fraud detection (e.g., the history of reception of a CAN message). In this case, the evaluation apparatus 101 may evaluate the security by comparing the log information with the expected value concerning the attacks held by the evaluation apparatus 101 and determining whether the attack succeeded or calculating the probability of successful attack.

(9) In the above embodiment, the electronic control system 11 is provided with an independent security ECU 104 as a security function. However, all or some of the ECUs that communicate with one another via a bus may be provided with a security function. Furthermore, a plurality of ECUs may achieve the security function in a distributed manner.

(10) While the above embodiment has been described with reference to the example in which the evaluation apparatus 101 is directly connected to the bus in the electronic control system 11 to be evaluated, a relay device, such as a gateway, may be provided between the evaluation apparatus 101 and an object to be evaluated. For example, the evaluation apparatus 101 may perform mutual authentication or unidirectional authentication with the gateway and send a CAN message for attack. Thereafter, the evaluation apparatus 101 may cause the gateway to forward the CAN message to the CAN bus 20. Subsequently, the evaluation apparatus 101 may acquire the CAN message from the CAN bus 20 via the gateway. In this manner, the evaluation apparatus 101 can evaluate the security of the object to be evaluated (e.g., the attack tolerance).

(11) The evaluation apparatus 101 may perform the operation of transmitting a fake authentication seed a plurality of times to obtain the authentication key from the rewriting ECU 102. Thereafter, the evaluation apparatus 101 may analyze the tendency and determine whether the authentication key can be inferred. In this manner, the evaluation apparatus 101 may evaluate the security function.

(12) Although each of the evaluation apparatus 101 and the variety types of ECUs according to the above-described embodiment is an apparatus including, for example, a digital circuit, such as a processor and a memory, an analog circuit, and a communication circuit, the evaluation apparatus 101 and the ECUs may further include other hardware constituent elements, such as a display, a keyboard, and a mouse. In addition, instead of achieving the function via software by the processor that executes a control program stored in the memory, the function may be achieved by dedicated hardware (e.g., a digital circuit). For example, the functional blocks of the CAN bus monitoring unit 203, the signal monitoring unit 204, the transceiver 201, the holding unit 202, the evaluation unit 206, the storage unit 208, and the control unit 207 of the evaluation apparatus 101 may be achieved by using integrated circuits. Furthermore, for example, the functional blocks of the transceiver 301, the signature storage unit 302, the key storage unit 303, the program storage unit 304, the rewrite procedure information storage unit 305, and the control unit 306 of the rewriting ECU 102 may be achieved by using integrated circuits. Still furthermore, for example, the functional blocks of the transceiver 401, the signature storage unit 402, the key storage unit 403, the program storage unit 404, the rewrite procedure information storage unit 405, and the control unit 406 of the rewritten ECU 103 may be achieved by using integrated circuits. Yet still furthermore, for example, the functional blocks of the transceiver 501, the CAN bus monitoring unit 502, and the control unit 503 of the security ECU 104 can be achieved by using integrated circuits.

(13) Some or all of the constituent elements of each of the apparatuses according to the above-described embodiment (e.g., the evaluation apparatus 101 and the variety of types of ECUs) may be composed of a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI accomplishes the function thereof. The units of each of the constituent elements of the above-described apparatuses may be formed as individual chips, or a part or all of the units may be integrated into a single chip. The term "LSI" is used herein, but the terms "IC", "system LSI", "super LSI" or "ultra LSI" may be used as well depending on the level of integration. Note that the circuit integration is not limited to an LSI and may be achieved by dedicated circuitry or a general-purpose processor other than an LSI. An FPGA (Field Programmable Gate Array), which is programmable after fabrication of the LSI, or a reconfigurable processor which allows reconfiguration of connections and settings of circuit cells in LSI may be used. Moreover, should a circuit integration technology replacing LSI appear as a result of advancements in semiconductor technology or other technologies derived from the technology, the functional blocks could be integrated using such a technology. Another possibility is the application of biotechnology, for example.

(14) Some or all of the constituent elements of each of the above-described apparatuses may be formed from an IC card removable from the apparatus or a single module. The IC card or the module is a computer system including a microprocessor, a ROM, and a RAM. The IC card or the module may include the above-described super multi-function LSI. The microprocessor operates in accordance with a computer program so that the IC card or the module accomplishes the function thereof. The IC card or the module can be tamper resistant.

(15) According to an aspect of the present disclosure, for example, an evaluation method including the entire or part of the processing procedure described in FIGS. 9 to 18 may be provided. For example, the evaluation method is an evaluation method for evaluating the security of the electronic control system 11 including a plurality of ECUs that communicate with one another via a bus (for example, the CAN bus 20). In the evaluation method, one or more attack frames including an invalidation frame (e.g., an error frame of CAN) for invalidating a frame on the bus is sent to the bus (e.g., S701 to S703, S901, S902, S1101 to S1103, S1201, S1202, S1301, S1302, S1401, S1402, S1501, S1601, and S1602). Each time an attack frame is sent to the bus, at least one of the plurality of ECUs is monitored and is evaluated on the basis of the result of monitoring (e.g., S801, S1001, S1203, S1403, and S1603). In addition, according to another aspect of the present disclosure, a computer program that provides processing relating to the evaluation method by using a computer is provided, or a digital signal formed from the computer program is provided. Furthermore, according to still another aspect of the present disclosure, a storage medium that allows a computer to read the computer program or the digital signal stored therein is provided. Examples of a storage medium include a flexible disk, a hard disk, a CD-ROM, an MO, a DVD, a DVD-ROM, a DVD-RAM, a BD (Blu-ray (registered trademark) Disc), and a semiconductor memory. Furthermore, the digital signal stored in such a storage medium is provided. According to still another aspect of the present disclosure, the computer program or the digital signal may be sent via an electric communication line, a wireless or wired communication line, a network represented by the Internet, data broadcast, or the like. According to still another aspect of the present disclosure, a computer system including a microprocessor and a memory is provided, where the memory can store the computer program and the microprocessor can operate in accordance with the computer program. In addition, by recording the program or the digital signal on the storage medium and transferring the storage medium or by transferring the program or the digital signal via the network or the like, the program or the digital signal may be executed by another independent computer system.

(16) Embodiments realized by combining the constituent elements and the functions described in the above embodiment and the modifications in any way are also encompassed within the scope of the present disclosure.

The present disclosure can be used to perform evaluation as to whether the security countermeasure technology applied to an electronic control system can properly defend itself during an attack.

What is claimed is:

1. An evaluation apparatus connected to a bus used by a plurality of electronic control units that constitute an electronic control system for communication, the evaluation apparatus evaluating the electronic control system, the evaluation apparatus comprising:
  a transmitter that sends, to the bus, at least one attack frame including an invalidation frame for invalidating a frame on the bus, the invalidation frame comprising an error frame;
  a monitor that monitors at least one of the plurality of electronic control units; and
  an evaluator that evaluates the electronic control system in terms of security on the basis of a result of monitoring performed by the monitor when the attack frame is sent from the transmitter to the bus, wherein
  the plurality of electronic control units include a rewriting electronic control unit and a rewritten electronic control unit,
  the rewriting electronic control unit sends to the bus an update frame for updating the software of the rewritten electronic control unit, and the rewritten electronic control unit updates software therein upon receiving an update frame from the rewriting electronic control unit, the monitor monitors at least one of the rewriting electronic control unit and the rewritten electronic control unit, the attack frame is transmitted from one of the rewriting control unit and the rewritten control unit to the other of the rewriting control unit and the rewritten control unit, and includes one of an authentication seed, an authentication key, a memory clear instruction, updated software, and an updated software signature, the monitor monitors at least one of the rewriting electronic control unit and a rewritten electronic control unit for the transmitted at least one of the authentication seed, the authentication key, the memory clear instruction, the updated software, and the updated software signature, and the error frame is sent before the entirety of the attack frame is transmitted from one of the rewriting control unit and the rewritten control unit to the other of the rewriting control unit and the rewritten control unit so that the attack frame is overwritten by the error frame and becomes invalid.

2. The evaluation apparatus according to claim 1, wherein the plurality of electronic control units communicate with one another via the bus in accordance with CAN (Controller Area Network) protocol.

3. The evaluation apparatus according to claim 2, further comprising:

a holder that holds attack procedure information indicating content of each of a plurality of attack frames and an order in which the attack frames are sent, and wherein the transmitter sends, to the bus, the plurality of attack frames in the transmission order indicated by the attack procedure information.

4. The evaluation apparatus according to claim 3, further comprising:

a receiver that receives a frame from the bus, wherein the attack procedure information indicates that an attack frame having a predetermined ID is sent subsequent to an error frame, and wherein the transmitter sends the error frame if the receiver receives the frame having the predetermined ID from the bus.

5. The evaluation apparatus according to claim 3, wherein the attack procedure information further indicates a transmission interval of the plurality of attack frames, and wherein the transmitter sends the plurality of frames to the bus in accordance with the transmission order and the transmission interval indicated by the attack procedure information.

6. The evaluation apparatus according to claim 2, wherein after sending the error frame, the transmitter sends an attack frame having the same ID as a frame invalidated by the error frame and content that differs from content of the invalidated frame.

7. The evaluation apparatus according to claim 2, wherein after sending an error frame, the transmitter sends an attack frame having an update ID predetermined for a process to update software of any one of the plurality of electronic control units in the electronic control system, and wherein the monitor monitors one of the electronic control unit having a function of updating the held software in response to reception of a frame having the update ID and the electronic control unit that sends a frame having the update ID.

8. The evaluation apparatus according to claim 1, wherein the monitor performs the monitoring by detecting whether an operation performed by one of the plurality of electronic control units when an attack frame is sent from the transmitter to the bus is the same as a predetermined operation, and wherein the evaluator evaluates the electronic control system so that a result of evaluation of the electronic control system varies in accordance with a result of the detection performed by the monitor after the attack frame is sent from the transmitter to the bus.

9. The evaluation apparatus according to claim 1, comprising:

a receiver that receives a frame from the bus, wherein the monitor detects that a particular frame is received by the receiver as a result of the monitoring of the electronic control unit, and wherein the evaluator evaluates the electronic control system so that a result of evaluation of the electronic control system varies in accordance with whether the monitor has detected reception of the particular frame within a predetermined period of time after transmission of the attack frame from the transmitter to the bus.

10. The evaluation apparatus according to claim 1, wherein the evaluator outputs, as a result of evaluation, information as to whether the electronic control system has attack tolerance.

11. An evaluation system for evaluating an electronic control system, the electronic control system including a plurality of electronic control units that communicate with one another via a bus, the evaluation system comprising:

a transmitter that sends, to the bus, at least one attack frame including an invalidation frame for invalidating a frame on the bus, the invalidation frame comprising an error frame;

a monitor that monitors at least one of the plurality of electronic control units; and an evaluator that evaluates the electronic control system in terms of security on the basis of a result of monitoring performed by the monitor when the attack frame is sent from the transmitter to the bus, wherein the plurality of electronic control units include a rewriting electronic control unit and a rewritten electronic control unit, the rewriting electronic control unit sends to the bus an update frame for updating the software of the rewritten electronic control unit, and the rewritten electronic control unit updates software therein upon receiving an update frame from the rewriting electronic control unit, the monitor monitors at least one of the rewriting electronic control unit and the rewritten electronic control unit, the attack frame is transmitted from one of the rewriting control unit and the rewritten control unit to the other of the rewriting control unit and the rewritten control unit, and includes one of an authentication seed, an authentication key, a memory clear instruction, updated software, and an updated software signature, the monitor monitors at least one of the rewriting electronic control unit and a rewritten electronic control unit for the transmitted at least one of the authentication seed, the authentication key, the memory clear instruction, the updated software, and the updated software signature, and the error frame is sent before the entirety of the attack frame is transmitted from one of the rewriting control unit and the rewritten control unit to the other of the rewriting control unit and the rewritten control unit to invalidate the attack frame so that the attack frame is overwritten by the error frame and becomes invalid.

12. An evaluation method for evaluating an electronic control system, the electronic control system including a plurality of electronic control units that communicate with one another via a bus, the method comprising:

sending, to the bus, at least one attack frame including an invalidation frame for invalidating a frame on the bus, the invalidation frame comprising an error frame;

monitoring with a monitor at least one of the plurality of electronic control units when the attack frame is sent to the bus; and evaluating the electronic control system in terms of security on the basis of a result of the monitoring, wherein the plurality of electronic control units include a rewriting electronic control unit and a rewritten electronic control unit, the rewriting electronic control unit sends to the bus an update frame for updating the software of the rewritten electronic control unit, and the rewritten electronic control unit updates software therein upon receiving an update frame from the rewriting electronic control unit, the monitor monitors at least one of the rewriting electronic control unit and the rewritten electronic control unit, the attack frame is transmitted from one of the rewriting control unit and the rewritten control unit to the other of the rewriting control unit and the rewritten control unit, and includes one of an authentication seed, an authentication key, a memory clear instruction, updated software, and an updated software signature, the monitor monitors at least one of the rewriting electronic control unit and a rewritten electronic control unit for the transmitted at least one of the authentication seed, the authentication key, the memory clear instruction, the updated software, and the updated software signature, and the error frame is sent before the entirety of the attack frame is transmitted from one of the rewriting control unit and the rewritten control unit to the other of the rewriting control unit and the rewritten control unit to invalidate the attack frame so that the attack frame is overwritten by the error frame and becomes invalid.

13. The evaluation apparatus according to claim 1, wherein the evaluation apparatus performs one of the following five operations:

(A) the attack frame sent to the bus is transmitted by the transmitter from the rewritten electronic control unit to the rewriting electronic control unit via the bus and includes an authentication seed, and the evaluator detects the attack frame including the authentication seed being transmitted by the transmitter from the rewritten electronic control unit to the rewriting electronic control unit on the bus, and transmits the error frame before the entire attack frame is received by the rewriting electronic control unit to invalidate the attack frame including the authentication seed sent from the rewritten electronic control unit so that the attack frame is overwritten by the error frame and becomes invalid, (B) the attack frame includes an authentication result of having authenticated an authentication key transmitted from the rewriting electronic control unit to the rewritten electronic control unit via the bus, is detected by the evaluator as flowing on the bus, and before the entire attack frame including the authentication result is received by the rewriting electronic control unit from the rewritten electronic control unit, the evaluator transmits the error frame to invalidate the attack frame including the authentication result sent from the rewritten electronic control unit so that the attack frame is overwritten by the error frame and becomes invalid, (C) the attack frame sent to the bus is transmitted by the transmitter from the rewriting electronic control unit to the rewritten electronic control unit via the bus and includes a memory clear instruction, and the evaluator detects the attack frame including the memory clear instruction being transmitted by the transmitter from the rewriting electronic control unit to the rewritten electronic control unit on the bus, and transmits the error frame before the entire attack frame is received by the rewritten electronic control unit to invalidate the attack frame including the memory clear instruction sent from the rewriting electronic control unit so that the attack frame is overwritten by the error frame and becomes invalid, (D) the attack frame sent to the bus is transmitted by the transmitter from the rewriting electronic control unit to the rewritten electronic control unit via the bus and includes updated software, and the evaluator detects the attack frame including the updated software being transmitted by the transmitter from the rewriting electronic control unit to the rewritten electronic control unit on the bus, and transmits the error frame before the entire attack frame is received by the rewritten electronic control unit to invalidate the attack frame including the updated software sent from the rewriting electronic control unit so that the attack frame is overwritten by the error frame and becomes invalid, or (E) the attack frame sent to the bus is transmitted by the transmitter from the rewriting electronic control unit to the rewritten electronic control unit via the bus and includes an updated software signature, and the evaluator detects the attack frame including the updated software signature being transmitted by the transmitter from the rewriting electronic control unit to the rewritten electronic control unit on the bus, and transmits the error frame before the entire attack frame is received by the rewritten electronic control unit to invalidate the attack frame including the updated software signature sent from the rewriting electronic control unit so that the attack frame is overwritten by the error frame and becomes invalid.

* * * * *